(12) United States Patent
Nishii et al.

(10) Patent No.: US 8,876,654 B2
(45) Date of Patent: Nov. 4, 2014

(54) TOROIDAL CONTINUOUSLY VARIABLE TRANSMISSION

(75) Inventors: Hiroki Nishii, Kanagawa (JP); Toshihiko Sato, Kanagawa (JP); Eiji Inoue, Kanagawa (JP); Toshiro Toyoda, Kanagawa (JP); Hiroyasu Yoshioka, Kanagawa (JP); Yuji Shimomura, Kanagawa (JP); Shin Yamamoto, Kanagawa (JP)

(73) Assignee: NSK Ltd., Tokyo (JP)

(*) Notice: Subject to any disclaimer, the term of this patent is extended or adjusted under 35 U.S.C. 154(b) by 568 days.

(21) Appl. No.: 12/953,881

(22) Filed: Nov. 24, 2010

(65) Prior Publication Data

US 2011/0130244 A1 Jun. 2, 2011

(30) Foreign Application Priority Data

Nov. 25, 2009 (JP) ................................. 2009-267177
Dec. 15, 2009 (JP) ................................. 2009-284125
Feb. 24, 2010 (JP) ................................. 2010-039035
Jun. 16, 2010 (JP) ................................. 2010-136889

(51) Int. Cl.
*F16H 15/38* (2006.01)

(52) U.S. Cl.
CPC ..................................... *F16H 15/38* (2013.01)
USPC ............................................. 476/40; 476/46

(58) Field of Classification Search
CPC ........................................................ F16H 15/38
USPC ................................................. 476/40, 42, 46
See application file for complete search history.

(56) References Cited

U.S. PATENT DOCUMENTS

2008/0009387 A1   1/2008   Nishii et al.

FOREIGN PATENT DOCUMENTS

| JP | 7-174201 | 7/1995 |
|---|---|---|
| JP | 8-326862 | 12/1996 |
| JP | 10-205599 | 8/1998 |
| JP | 11-062950 | 3/1999 |
| JP | 2001-12574 | 1/2001 |
| JP | 2001-122200 | 5/2001 |

(Continued)

OTHER PUBLICATIONS

Japanese Office Action dated Oct. 22, 2013 for the Corresponding Japanese Patent Application No. 2010-039035.

*Primary Examiner* — William C Joyce
(74) *Attorney, Agent, or Firm* — Katten Muchin Rosenman LLP

(57) ABSTRACT

A toroidal continuously variable transmission of the present invention comprises: input side disks (1a, 1b) and output side disks (6) being supported concentric with each other such that the disks can rotate freely; a trunnion (9) that comprises end sections (36) on both ends on which tilt shafts (13) that are concentric with each other are provided, and a support beam section (15) that extends between both end sections (36), the trunnion (9) being capable of pivotally displacing around the tilt shafts (13); a thrust rolling bearing (17); and a power roller (8) that is supported to the inside surface of the trunnion (9) by way of the thrust rolling bearing (17) such that it rotates freely; wherein the support beam section (15) comprises an inside surface having a cylindrical convex surface (14); the thrust rolling bearing (17) comprises an outer race (18a) having an outside surface with a concave section (19a) that fits with the cylindrical convex surface (14) of the support beam section (15), and a plurality of rolling bodies (26) that are located between the power roller (8) and a track of an outer race (18a); and the concave section (19a) of the outer race (18a) has side surface sections (29) on both sides in the width direction, fits with the cylindrical convex surface (14) by the cylindrical convex surface (14) coming in contact with both side surface sections (29).

3 Claims, 33 Drawing Sheets

(56) References Cited

FOREIGN PATENT DOCUMENTS

| | | |
|---|---|---|
| JP | 2001-323982 | 11/2001 |
| JP | 2003-090405 | 3/2003 |
| JP | 2004-286053 | 10/2004 |
| JP | 2005-121045 | 5/2005 |
| JP | 3733992 | 10/2005 |
| JP | 2007-162897 | 6/2007 |
| JP | 2008-25821 | 2/2008 |
| JP | 4100072 | 3/2008 |
| JP | 2009-30639 | 2/2009 |

Prior Art

Prior Art

Prior Art

Prior Art

TOROIDAL CONTINUOUSLY VARIABLE TRANSMISSION

BACKGROUND OF THE INVENTION

1. Field of the Invention

The present invention relates to a toroidal continuously variable transmission, and particularly to a half toroidal continuously variable transmission, that can be used as an automatic transmission for an automobile or as a transmission for all kinds of industrial machinery.

2. Description of the Related Art

The use of a toroidal continuously variable transmission as an automobile transmission, for example, is described in many publications, and the toroidal continuously variable transmission has been partially implemented and it has been well known. Particularly, toroidal continuously variable transmissions having various construction are disclosed in Japanese Patent Application Publication No. 2008-25821. FIG. 26 illustrates the basic construction of a currently implemented toroidal continuously variable transmission as disclosed in this document.

First, a first example of this conventional construction is explained. A pair of input side disks 1a, 1b are supported around an input rotating shaft 2 such that, when the inner surfaces 3 on the input side thereof, which are toroidal curved surfaces (concave surface having an arc shaped cross section), face each other, the disks 1a, 1b are concentric with each other and freely rotate in synchronization.

An output cylinder 5 having an output gear 4 fastened around the outer peripheral surface in the midsection thereof is supported around the middle section of the input rotating shaft 2 such that it rotates freely with respect to the input rotating shaft 2. In addition, output side disks 6 are supported around the both end sections of this output cylinder 5 via spline joints such that they freely rotate in synchronization with the output cylinder 5. In this state, inside surfaces 7 on the output side of both output side disks 6, which are toroidal curved surfaces, face the inside surfaces 3 on the both input sides.

Two power rollers 8, the peripheral surfaces thereof being spherical convex surfaces, are placed around the input rotating shaft 2 in each of the portions (cavities) between the inner surfaces 3, 7 on the input sides and output sides. These power rollers 8 are supported by the inside surface of the respective trunnions 9 by way of support shafts 10, whose base side section and tip side section are eccentric, and a plurality of rolling bearings such that they can freely rotate around the tip side section of the support shafts 10, and can pivot and displace a little around the base side section of the support shafts 10.

Each trunnion 9 can freely pivot and displace around tilt shafts that are concentrically provided on both ends in the lengthwise direction (front to rear direction of FIG. 26) of each trunnion 9. The operation that pivots (tilts) each trunnion 9 is performed by a hydraulic actuator displacing the trunnion 9 in the axial direction of the tilt shaft. When changing speed, each trunnion 9 is displaced in the axial direction of the tilt shaft by supplying hydraulic fluid to or removing hydraulic fluid from each actuator. As a result, the direction in which the force that acts in the tangential direction of the contact section (traction section) between the peripheral surface of each power roller 8 and the inside surfaces 3, 7 on the input side and output side changes (side slipping occurs), so each trunnion pivots and displaces around each tilt shaft.

During operation of a toroidal continuously variable transmission as described above, one of the input-side disks 1a (left disk in FIG. 26) is rotated and driven by the drive shaft 11 via a loading cam pressure unit 12. As a result, the pair of input-side disks 1a, 1b that are supported on both ends of the input rotating shaft 2 rotate in synchronization while being pressed in a direction toward each other. Moreover, this rotation is transmitted to both output-side disks 6 via each power roller 8 and output from the output gear 4.

In the case of changing the rotational speed ratio between the input rotating shaft 2 and the output gear 4, first, when reducing the speed between the input rotating shaft 2 and the output gear 4, each trunnion 9 is pivoted to the position illustrated in FIG. 26, to brace the peripheral surface of each power roller 8 in contact with both the section toward the center of the inside surface 3 on the input side of each input-side disk 1a, 1b and the section toward the outer periphery of the output side inside surface 7 of both output-side disks 6. On the other hand, when increasing the speed, each trunnion 9 is pivoted to the opposite direction of that illustrated in FIG. 26, to brace the surface around each power roller 8 into contact with both the section toward the outer periphery of the inside surface 3 of the input side of both input-side disks 1a, 1b, and the section toward the center of the inside surface 7 of the output side of both output-side disks 6. By setting the pivot angle of each trunnion 9 to an intermediate angle, an intermediate speed ratio (transmission gear ratio) is obtained between the input rotating shaft 2 and the output gear 4.

When operating the toroidal continuously variable transmission as described above, each member to which the power is transmitted, or in other words, each input-side and output-side disk 1a, 1b, 6 and each power roller 8 elastically deforms based on the pressure force (thrust force) that is generated by the pressure unit 12. In addition, with this elastic deformation, each disk 1a, 1b, 6 displaces in the axial direction. Moreover, the pressure force that the pressure unit 12 generates becomes larger the larger the torque that is transmitted by the toroidal continuously variable transmission becomes, and as that happens the amount of elastic deformation of each member becomes large. Therefore, in order to properly maintain the contact state between each inside surface 3, 7 on the input side and output side and the peripheral surface of each power roller 8, regardless of fluctuation in the torque, a mechanism that causes each power roller 8 to displace in the axial direction of each disk 1a, 1b, 6 toward each trunnion 9 is necessary. In the case of the first example of conventional construction illustrated in FIG. 26, each power roller 8 is caused to displace in the axial direction by pivoting and displacing the tip side section of each support shaft 10 that supports the power roller 8 around the base side section of the support shaft 10.

In the case of the first example of this kind of conventional construction, construction for causing each power roller 8 to displace in the axial direction is complex, making the manufacturing, management and assembly work of parts troublesome and an increase in cost is unavoidable. Construction as illustrated in FIG. 27 to FIG. 33 is disclosed in Japanese Patent Application Publication No. 2008-25821 as technology for solving such a problem.

In the following, a second example of conventional construction as illustrated in FIG. 27 to FIG. 33 is explained. A feature of this second example of conventional construction is the construction of a section that supports a power roller 8a with respect to a trunnion 9 such that it can displace in the axial direction of the each input-side and output-side disk 1a, 1b, 6 (see FIG. 26), where the construction and operation of the overall toroidal continuously variable transmission is the same as in the first example of conventional construction illustrated in FIG. 26.

The trunnion 9a of this second example of conventional construction comprises a pair of tilt shafts 13 on both ends of the trunnion 9 that are concentric with each other, and a support beam 15 of which at least the side surface on the inside (upper side in FIGS. 28, 30 to 32) in the radial direction of both the input-side and output-side disks 1a, 1b, 6 is a cylindrical convex surface 14. Both tilt shafts 13 are pivotally supported by a yoke (this construction is known, so is not illustrated in the figures) or the support plate section of pivot frame by way of radial needle bearings 16 (see reference number 13 and 14 in FIGS. 71 and 72 of Japanese Patent Application Publication No. 2008-25821).

As illustrated in FIG. 28 and FIG. 31, the center axis A of the cylindrical convex surface 14 is parallel with the center axis B of both tilt shafts 13, and is located further outside in the radial direction of the disks 1a, 1b, 6 than the center axis B of both tilt shafts 13. Moreover, a partially cylindrical concave section 19 is provided on the outside surface of the outer race 18 of a thrust ball bearing 17 that is provided between the support beam 15 and the outside surface of the power roller 8 such that it passes over this outside surface in the radial direction. In addition, this concave section 19 fits with the cylindrical convex surface 14 of the support beam 15 and supports the outer race 18 such that it can pivot and displace in the axial direction of each disk 1a 1b, 6 with respect to the trunnion 9a. The radius of curvature r19 of the cross-sectional shape of the concave section 19 equal to or greater than the radius of curvature r14 of the cross-sectional shape of the cylindrical convex surface 14, and this concave section 19 and cylindrical convex surface 14 come in direct contact over the entire surface or in the portion near the bottom section of this concave section 19.

The support shaft 10a is fastened to and integrated with the outer race 18 at a central section on the inside surface of the outer race 18, and the power roller 8a is supported around this support shaft 10a by way of a radial needle bearing 20 such that it can rotate freely. Moreover, a downstream side oil supply path 21 for supplying lubrication oil to the thrust ball bearing 17 and radial needle bearing 20 is provided in the inside of the outer race 18 and support shaft 10a, and an upstream side oil supply path 22 that connects to this downstream side oil supply path 21 is provided in the inside of the support beam 15. Both of these oil supply paths 21, 22 are connected to each other by way of a concave hole 31 that is formed in the central section of the concave section 19 regardless of the pivot displacement of the outer race 18, and furthermore, an oil supply pipe 23 that connects to the upstream side oil supply path 22 is provided outside the support beam 15. The end section on the upstream side of this oil supply pipe 23 opens into the inner radial side of a pulley 24 that is provided on the end section of the trunnion 9 for suspending a synchronizing cable, and is able to supply lubrication oil through the inner radial side of this pulley 24.

Furthermore, a pair of stepped surfaces 25 that face each other are provided on the inside surface of the trunnion 9a where both end sections of the support beam 15 connect with pair of tilt shafts 13. Moreover, both of these stepped sections 25 and the outer surface of the outer race 18 of the thrust ball bearing 17 come in contact or come close to each other, so that the traction force that is applied to the outer race 18 from the power roller 8a can be supported by either of the stepped surfaces 25.

With the toroidal continuously variable transmission of this second example of conventional construction described above, construction wherein the power roller 8a is displaced in the axial direction of each disk 1a, 1b, 6 such that contact between the surface around this power roller 8a and each disk 1a, 1b, 6 is properly maintained regardless of change in the amount of elastic deformation of each component member, can be made easily and at low cost.

In other words, in the case of operating the toroidal continuously variable transmission, if there is a necessity to displace each power roller 8a in the axial direction of each disk 1a, 1b, 6 based on the elastic deformation of the each of the input-side and output-side disks 1a, 1b, 6 and each power roller 8a, the outer race 18 of the thrust ball bearing 17 that supports each power roller 8a such that it freely rotates, pivots and displaces around the center axis A of the cylindrical convex surface 14 while at the same time the outer race 18 causes a contact surface between the partial cylindrical shaped concave section 19 that is provided on the outside surface of the outer race 18 and the cylindrical convex surface 14 of the support beams to slide. Based on this pivotal displacement, the portion of the peripheral surface of each power roller 8a that comes in rolling contact with the one side surface in the axial direction of each disk 1a, 1b, 6 displaces in the axial direction of each disk 1a, 1b, 6 and the contact state above is properly maintained.

As describe above, the center axis A of the cylindrical convex surface 14 is located further on the outside in the radial direction of each disk 1a, 1b, 6 than the center axis B of the tilt shafts 13, which become the center of pivoting of each trunnion 9a when changing speed. Therefore, the pivot radius of pivotal displacement around the center axis A of the cylindrical convex surface 14 is greater than the pivot radius during the speed change operation, and the effect on fluctuation of the transmission ratio between the input-side disks 1a, 1b and the output side disks 6 decreases to within a range that can be ignored or easily corrected.

As illustrated in FIG. 32A, in the case of embodying the second example of conventional construction described above, the radius of curvature r19 of the cross-sectional shape of the concave section 19 is typically larger than the radius of curvature r14 of the cross-sectional shape of the cylindrical convex surface 14 (r19>r14). The reason for this is that when both radii of curvature r19, r14 are equal to each other (r19=r14) the inner surface of the concave section 19 and the cylindrical convex surface 14 come in contact over the enter area of the portions that face each other, making it difficult to feed lubrication oil to this area of contact. The inner surface of the concave section 19 and the cylindrical convex surface 14, when in a state of being in contact by a large surface pressure, move and displace with respect to each other, so when the feeding of lubrication oil to this area of contact is poor, it becomes easy for large friction due to metallic contact to occur.

However, even when the radius of curvature r19 of the cross-sectional shape of the concave section 19 is greater than the radius of curvature r14 of the cross-sectional shape of the cylindrical convex surface 14 (r19>r14), the following problems arise. In other words:

(1) It becomes easy for friction to occur locally between the inner surface of the concave section 19 and the cylindrical convex surface 14.

(2) It is difficult to maintain durability of the thrust ball bearing 17.

The reason that problem (1) occurs is that, as illustrated in FIG. 32(A), the inner surface of the concave section 19 and the cylindrical convex surface 14 are in a state of nearly tangential contact only at or near the bottom section of the concave section 19, and the surface pressure at the area of contact becomes high.

The reason that problem (2) occurs is that, due to the large thrust load that is applied to the thrust ball bearing 17 from the power roller 8a, the outer race 18 elastically deforms such that the inside surface side thereof forms a partial convex cylinder shape. As is known in the technical field of toroidal continuously variable transmissions, when operating a half toroidal type toroidal continuously variable transmission that is the object of the present invention, a large thrust load is applied to the thrust ball bearing 17 from the power roller 8a. In addition, as exaggeratedly illustrated in FIG. 32B, due to this thrust load, the output race 18 of the thrust ball bearing 17 elastically deforms such that the inner surface of the concave section 19 follows the cylindrical convex surface 14, or in other words, such that the both surfaces come into contact over nearly the entire surface thereof. Moreover, due to this elastic deformation, the distance between the outer race track 28 that is provided on the inside surface of the outer race 18 and the inner race track 27 that is provided on the outside surface of the power roller 8a becomes uneven in the circumferential direction of the outer race 18. Furthermore, due to the difference in the distance between both of these tracks 28, 27, the surface pressure of the area of rolling contact between these tracks 28, 27 and the rolling surface of the balls 26 (see FIG. 33) becomes very uneven in the circumferential direction of the outer race 18. More specifically, as indicated by a in FIG. 33, the surface pressure at the area of rolling contact between both tracks 28, 27 and the rolling surfaces of the balls 26 becomes excessive at two locations on opposite sides in the length direction (axial direction of the support beam 15) of the trunnion 9a. As a result, the rolling fatigue life of these tracks 28, 27 becomes very short at these two locations on opposite sides in the length direction, and becomes an obstacle in maintaining durability of the toroidal continuously variable transmission.

In addition, in a toroidal continuously variable transmission such as the first example of conventional construction, both a normal force (force that occurs due to the pressure force necessary for traction drive) that is perpendicular to the contact point between the power roller 8 of the toroidal continuously variable transmission and disks 1a, 1b, 6, and a tangential force (traction force) that is parallel to the direction of rotation of the power roller 8 act on the power roller 8 at the point of contact. The trunnion 9 supports these two forces by way of the power roller 8. For example, the normal force is transmitted to the trunnion 9 by way of a thrust needle bearing 32 that is located between the outside surface of the outer race 18 of the thrust ball bearing 17, of which the power roller 8 functions as the inner race, and the inside surface of the support beam 15 of the trunnion 9.

A circular hole in which the base side section of a support shaft 10 as described above is inserted is provided in the trunnion 9, and the radial needle bearing that supports the base side section of the support shaft 10 such that it rotates freely is provided inside that circular hole such that the tangential force above is transmitted to the trunnion 9 from the support shaft 10 via the radial needle bearing. Therefore, it is necessary to provide a circular hole (through hole or partial hole) in the trunnion 9 in this way that will receive the support shaft 10 and radial needle bearing.

Therefore, by forming a circular hole in the support beam section 15 of the trunnion 9, the rigidity of the trunnion 9 is decreased, which becomes a problem, in that deformation due to the normal force from the power roller 8 becomes large, or stress increases, for example.

When deformation of the trunnion 9 becomes large, there is also a possibility that this deformation will cause problems such as cause the position of the contact point between the disks 1a, 1b, 6 and the power roller 8 to shift from the design value and cause the surface pressure to increase at that contact point, or that will cause the transmission ratio to shift. In addition, when controlling the transmission by using a precession cam, the position of the precession cam shifts due to deformation of the trunnion 9, and this also becomes a major cause of shifting of the transmission ratio.

In order to prevent such problems, and to prevent damage to the trunnion 9 caused by an increase in stress as described above, and as the thickness of the parts of the trunnion 9 is increased in order to maintain sufficient rigidity of the trunnion 9 in which a circular hole is formed, the weight of the trunnion 9 increases, and thus the overall weight of the transmission increases, causing other problems to occur such as a drop in fuel efficiency or increase in cost.

To solve this problem, construction is disclosed in which the tangential force can be supported without forming a circular hole in the trunnion 9. For example, in a third example of conventional construction as disclosed in Japanese Patent Application Publication No. 2001-12574, a roller bearing is located between the outer peripheral surface of the outer race 18 and the portion of the trunnion 9 that faces the outer peripheral surface of the outer race 18 such that the tangential force is transmitted from the power roller 8 to the trunnion 9 by the way of that roller bearing, and that tangential force is supported by the trunnion 9.

In this way, it is not necessary to support the base side section of the support shaft 10 by a radial needle bearing that is provided in a circular hole in the trunnion 9, and from a structural aspect, the circular hole and radial needle bearing in the trunnion 9 are eliminated, and there is also no need for the base side section of the support shaft 10, so there only needs be a shaft section that is integrated with the outer race, which corresponds to the tip side section of the support shaft 10. However, in this case, it is necessary that a track surface for the roller bearing be formed around the outer peripheral surface of the outer race 18, so there is a possibility that the processing cost will increase.

On the other hand, in the second example of conventional construction disclosed in Japanese Patent Application Publication No. 2008-25821, construction is such that the outer peripheral surface of the outer race 18 comes in direct contact with the portion of the trunnion 9a that faces that outer peripheral surface, and the tangential force described above is transmitted from this area of contact. In this case, it is not necessary to provide the roller bearing above, so there is no need to provide a track surface around the outer peripheral surface of the outer race 18, and thus it is possible to reduce the cost.

However, a track groove (ball groove) for the rolling bodies (balls) of the thrust ball bearing 17 are formed in the outer race 18, where the outer peripheral surface thereof comes in direct contact or indirect contact by way of a member such as a roller bearing with the trunnion 9, 9a, along the circumferential direction on the side near the outer peripheral surface of the inside surface of the outer race 18, so the rigidity of the portion of the inside surface side of the thickness from the outside surface to the inside surface of the portion of the outer perimeter of the outer race 18 that becomes the power roller 8, 8a side becomes low.

In other words, in the case of construction wherein of the range of thickness from the inside surface to the outside surface of the outer race 18, in the range of the depth of the track groove on the inside surface, there is only sufficient thickness in the radial direction from the outer peripheral surface of the outer race 18 to the track groove, and tangential force is transmitted by bringing the outer peripheral surface of the outer race 18 in contact with the trunnion 9, 9a, so the stress at the portion on the inside surface side of this outer peripheral portion of the outer race 18, which is a corner section between the outer peripheral surface and inside surface of the outer race, increases.

Moreover, as described above, even though the rigidity of the trunnion 9, 9a is high, there is a possibility that the trunnion 9, 9a will deform a little, and in this case, the force acts from the trunnion 9, 9a toward the outer surface of the outer race 18, and stress at the portion on the inside surface side of this outer portion of the outer race 18 further increases.

Furthermore, even if the rigidity of the trunnion 9, 9a becomes high, there is a possibility that the trunnion 9, 9a will be slightly deformed, and, in this case, the force acts from the trunnion 9, 9a to the outer peripheral surface of the outer race 8 and the stress increases at the portion on the inside surface side of this outer peripheral portion of the outer race 18.

Therefore, in order that the stress that occurs as described above becomes equal to or less than a reference value or within an allowable range, increasing the thickness of the outer race 18 is feasible, however, in this case, problems occur such as the weight of the outer race 18 and the required installation space increases, so another method is desired in order that these problems do not occur.

In addition, by using construction wherein the tangential force is supported by the outer peripheral surface of the outer race 18, there is a problem in that the deformation of the track groove portion of the outer race 18 becomes large as the stress at the portion on the inside surface side of the outer peripheral portion of the outer race 18 increases. In this case, as the deformation of the track groove increases, the resistance to the rolling of the rolling bodies (balls) increases. Moreover, due to this rolling resistance, there is a possibility that the transmission efficiency of the overall transmission will decrease.

Incidentally, a traction drive toroidal continuously variable transmission such as that of the second example and third example of conventional construction transmits power by using a special fluid (traction fluid) that transitions to a glass form under high pressure. Therefore, in a state of power transmission, it is necessary that a pressure force that is proportional to the transmitted torque be applied at the contact point between the disks 1a, 1b, 6 and power roller 8a. By applying this pressure force, the power roller 8a that is located between the disks 1a, 1b, and the trunnion 9a that supports that power roller 8a, receive a large force that acts as if to move them toward the outside. In order to support this force, a pair of yokes is placed above and below the trunnion 9a such that the tilt shafts 13 of the trunnion 9a are supported.

This pair of yokes regulates the movement toward the outside of the trunnion 9a. When there is no yoke, there is a possibility that the power roller 8a will shift from the correct position, causing the efficiency to drop and the life to decrease. Circular shaped attachment holes are formed in the central section in the width direction of each of the pair of yokes, where the inner peripheral surface of the attachment holes is a spherical concave surface, and posts having a spherical surface that are supported by a member attached to the casing of the toroidal continuously variable transmission fit inside the holes such that the yokes are supported by the spherical surfaced posts so that they freely pivot. However, the space between the trunnion 9a and the yokes is not regulated, and there is a high possibility that the trunnion 9a and yokes will come in contact with each other.

In this state, when the trunnion 9a rotates or tilts around the tilt shafts 13 (center axis of the tilt shafts 13), the shoulder section (base end section on the support beam section 15 side of both end sections 36) of the trunnion 9a and the yokes rub against each other, causing the friction resistance to increase. This increase in friction resistance hinders the tilt movement, and there is a possibility that operation will become unstable.

In order to handle this problem, a method of reducing the friction during tilting by forming protrusions on the yokes where the yokes come in contact with the trunnion 9a in order to reduce the contact surface area is disclosed in Japanese Patent Application Publication No. 1995(H07)-174201, for example. However, in the invention disclosed in this document, by forming protrusions on the yokes that come in contact with the trunnion, friction can be reduced, however, wear of the trunnion due to contact with the yoke cannot be prevented. In addition, forming protrusions on the yokes brings about an increase in cost.

Moreover, due to contact between the trunnion 9a and yokes, wear of the trunnion 9a occurs at the areas of contact between the trunnion 9a and the yokes. Therefore, in Japanese Patent Application Publication No. 2004-286053, a method is disclosed in which wear is prevented by tempering the area of the trunnion 9a that comes in contact with the yokes in order to increase the surface hardness. By tempering, it is possible to prevent wear of the trunnion, however, that does not mean that friction can be reduced. In addition, finishing of the trunnion is necessary, so an increase in cost is unavoidable.

In Japanese Patent Application Publication No. 2005-121045, a technique is proposed of preventing wear of the trunnion 9a by using construction wherein a plate is sandwiched and held between radial needle bearings 16 that are provided on the tilt shafts 13 of the trunnion 9a in order to function as tilt bearings, and the shoulder portion of the trunnion 9a, and bringing this plate in contact with the yokes. In this case, there is no increase in cost for processing the trunnion and yokes, however, similarly, this does not mean that friction can be reduced.

Furthermore, in Japanese Patent Application Publication No. 2001-323982, a method is disclosed whereby the both friction and wear are reduced by forming an arc shaped groove on one of the trunnion 9a and the yokes in the area of contact between them, which is formed around the center axis of the tilt shafts 13, and placing a plurality of balls in that groove so that there is rolling contact between the trunnion 9a and yokes. In this case, both friction and wear can be reduced, however, it is necessary to form an arc shaped groove on the trunnion, for example, and because that groove will be the surface over which the balls will pass, the surface of the groove must be processed, which increases the cost. In addition, there are also problems of workability in that balls may fall during assembly, and measures must be taken so that there is no shifting of position.

On the other hand, in a toroidal continuously variable transmission, when a high torque transmission capacity is needed, for example, in cases where it is installed in a vehicle having a large amount of exhaust, heat generated at the point of contact between the disks 1a, 1b, 6 and the power roller 8, 8a, or heat generated in the power roller bearing unit (thrust ball bearing 17) causes the breakdown or softening of residual austenite as the power roller 8, 8a becomes tempered, so there is a possibility of a decrease in durability, or a drop in the set value for μ (operation traction coefficient) as the temperature of the traction surface increases, or in other words, various problems occur such as an increase in pressure force between the input-side and output-side disks 1a, 1b, 6 and the power roller 8, 8a, and there is a further decrease in the power transmission efficiency.

Therefore, a method is proposed where by increasing the radius of the outer track groove (radius of curvature of the inner peripheral surface of the outer track groove) of the outer race with respect to the radius of the inner track groove (radius of curvature of the inner peripheral surface of the inner track groove) of the power roller 8, 8a, which functions as the inner race of the thrust ball bearing 17, a spin control state is formed in which there is pure rolling between the inner race and the rolling bodies, and there is spin slippage between the outer race and the rolling bodies (for example, refer to Japanese Patent Application Publication No. 2001-122200). In other words, through this inner race spin control, the heat generated on the outer race side of the thrust ball bearing 17 becomes large, and it is possible to suppress heat being generated on the inner race or power roller 8, 8a side, and by suppressing the heat generated by the power roller 8, 8a, the traction coefficient can be improved as well as the power transmission efficiency can be improved. However, when suppressing the heat generation by the power roller 8, 8a, which is the inner race, as the inner race spin control, there is a problem of damage to the outer race side. In addition, in the thrust ball bearing 17, the heat generated by the outer race side becomes large, so heat resistance and durability of the outer race 18 become a problem.

Moreover, the thickness of the outer race 18 is thin with respect to the power roller 8, 8a, so the outer race 18 deforms easily. Furthermore, in the surface hardening process, such as carburizing, carbonitriding, high-frequency tempering and the like, the depth of the surface hardened layer cannot be made deep. Therefore, in order to prevent damage to the outer race, a method is disclosed (for example, refer to Japanese Patent No. 3,733,992), where opposite to the example described above, as outer race spin control, the radius of the track groove of the inner race is made larger than the radius of the track groove of the outer race, making it possible to lower the temperature of the outer race. However, when trying to prevent damage to the outer race 18 as outer race spin control, the heat generated by the power roller 8, 8a becomes large, and thus there is a possibility of problems occurring such as a decrease in power transmission efficiency due to the rise in temperature of the power roller 8, 8a.

On the other hand, a technique is disclosed (for example, refer to Japanese Patent No. 4,100,072) in which the durability of the rollers is maintained by increasing the heat resistance of the rollers based on the composition of materials used in the rollers of a full toroidal continuously variable transmission. However, this document discloses a composition of materials preferable for the rollers of a full toroidal continuously variable transmission and not a half toroidal type. The bending stress that acts on a half toroidal power roller 8, 8a is larger than that acting on a full toroidal power roller, so with the composition given in this document, cracking is a concern when manufacturing a power roller 8, 8a.

Furthermore, a method is disclosed (for example, refer to Japanese Patent Application Publication No. H08-326862) that improves the rolling fatigue characteristics of a power roller 8, 8a through the composition of the materials used in a power roller 8, 8a of a toroidal continuously variable transmission, and by surface hardening. In this document, the composition of materials of a power roller 8, 8a employed is suitable to high-frequency tempering, however, neither the heat generation in the thrust ball bearing 17 nor the relationship of the material characteristics with the other construction have been considered. Therefore, depending on the construction of the thrust ball bearing 17 and the construction of the outer race 18, there is a possibility that the disclosed composition of materials is not the most suitable composition.

SUMMARY OF THE INVENTION

Taking the aforementioned problems into consideration, the object of the present invention is to provide construction that is simple and low cost, and that is capable of suitably maintaining a state of contact between the peripheral surface of each power roller and the input and output disks by causing each power roller to displace in the axial direction of the input and output disks, regardless of change in the amount of elastic deformation of the component members.

Particularly, the object of the present invention is to maintain contact surface area between the inner surface of a concave section that is formed around the outside surface of an outer race of a thrust rolling bearing and a cylindrical convex surface that is formed on a support beam section of a trunnion, suppress the wear of these surfaces, and suppress the elastic deformation of the outer race, as well as to maintain durability of the thrust rolling bearing and improve the durability of the overall toroidal continuously variable transmission.

Moreover, another object of the present invention is to provide construction capable of preventing an increase in stress in the outer peripheral portion of the outer race when the tangential force acting on a power roller is transmitted from the outer peripheral surface of the outer race of the thrust rolling bearing of the power roller to a trunnion having a contact section that comes in direct or indirect contact with the outer peripheral surface of the outer race.

Furthermore, another object of the present invention is to provide a toroidal continuously variable transmission capable of reducing friction and wear at the area of contact between the trunnion and yokes, and preventing an increase in processing cost by simplifying the processing of the trunnion.

In addition, another object of the present invention is to provide a toroidal continuously variable transmission that is capable of improving the power transmission efficiency by lowering the temperature of the power rollers through employing inner race spin control in the thrust rolling bearing of the power rollers, and that is also capable of maintaining durability as heat generated by the outer race increases due to the use of inner race spin control.

The toroidal continuously variable transmission of the present invention, similar to the conventionally known toroidal continuously variable transmission disclosed in Japanese Patent Application Publication No. 2008-25821, comprises input side and output side disks that are composed of at least a pair of disks, a plurality of trunnions and a plurality of power rollers.

The input side disk and output side disk are such that, in a state of the inside surfaces facing each other, the disks are concentric with each other and are supported such that they can freely rotate.

Each of the trunnion is positioned such that it is skew against the center axis of the input side disk and output side disk, and comprises end sections on both ends on which tilt shafts that are concentric with each other are provided, and a support beam section that extends between the both end sections.

A thrust rolling bearing is provided on the inside surface side of each of the trunnion, and each of the power rollers is supported by the inside surface of the trunnion by way of the thrust rolling bearing so that it rotates freely, and a peripheral surface of the power roller that is a spherical convex surface, comes in contact with the inside surfaces of the input side disk and output side disk.

Particularly, in the toroidal continuously variable transmission of the present invention, the support beam section of the trunnion comprises an inside surface that is a cylindrical convex surface having a center axis that is parallel with the center axis of the tilt shafts and located further on the outside than the center axis of the tilt shafts;

the thrust rolling bearing is located on the support beam section side and comprises an outer race having an outside surface with a concave section that fits with the cylindrical convex surface of the support beam section, and a plurality of rolling bodies that are located between an outer race track that is formed around the inside surface of the outer race and an inner race track that is formed on the outside surface of the power roller, where together with the thrust rolling bearing being supported by the trunnion by the fit between the cylindrical convex surface of the support beam section and concave section of the outer race such that pivotal displacement is possible in the axial direction of the input side disk and output side disk, receives a load in the thrust direction that is applied to the power roller and supports the power roller such that the power roller rotates freely; and the concave section of the outer race has side surface sections on both sides in the width direction, with the cylindrical convex surface of the support beam section coming in contact with both side surface sections of the outer race to fit the cylindrical convex surface with the concave section.

In the present invention, the shape of the concave section of the outer race is not limited as long as it comprises sides surface sections on both sides that come in contact with the cylindrical convex surface of the support beam section, however, it is preferred that both side surface sections comprise a pair of side concave curved surface sections having a cross-sectional radius of curvature that is greater than the cross-sectional radius of curvature of the cylindrical convex surface of the support beam section. In addition, it is preferred that the concave section have a Gothic arch shaped cross section.

Furthermore, in this case, it is preferred that the concave section have a center concave curved surface section located between the side concave curved surface sections that have a cross-sectional radius of curvature that is less than the cross-sectional radius of curvature of the cylindrical convex surface of the support beam section, and that the edges of the ends on the center side of both side concave curved surfaces smoothly connect with the edges of the ends on both sides of the center concave curved surface section.

The present invention can be applied to the toroidal continuously variable transmission having a construction where a contact section is formed in the trunnion that transmits tangential force acting on the power roller to the trunnion by coming in direct contact or indirect contact with the outer peripheral surface of the outer race and forming a circular hole in the trunnion is not required. However, in this construction, preferably a crowned surface is formed on the outer peripheral surface of the outer race and comes in contact with the contact section, and the position of the apex of the crowned surface, which is the outermost peripheral side of the crowned surface, is located further on the outside surface side of the outer race than the deepest position of the track groove of the outer race track.

Moreover, when an outer race side contact surface that comes in contact with the contact section is formed on the outer peripheral surface of the outer race instead of this crowned surface, preferably the outer race side contact surface is located further on the outside surface side of the outer race than the deepest position of the track groove of the outer race track.

Furthermore, The present invention can be applied to the toroidal continuously variable transmission having a construction that comprises a pair of yokes that together with supporting the tilt shafts such that the tilt shafts freely pivot and freely displace in the axial direction, pivot due to displacement of the trunnion. In this construction, preferably holes are formed in both end surfaces of both side sections of the trunnion that face the yokes at a position that crosses the center axis of the cylindrical convex surface, and contact members that come in contact with the yokes are installed in the holes.

In this case, preferably the hardness of the contact members is greater than the hardness of the trunnion. Also, preferably the contact members are pressure fitted inside the holes.

In addition, in the toroidal continuously variable transmission of the present invention, preferably the outer race is formed of high carbon steel having heat resistance, the inner race is formed of low carbon steel having a lower carbon content than high carbon steel, carbonitriding is performed for at least the inner race as hardening heat treatment, and the radius of the outer race track of the outer race (radius of curvature of the inner peripheral surface of the outer race track) is greater than the radius of the inner race track (radius of curvature of the inner race track) of the power roller.

The high carbon steel of the outer race preferably has a composition of C: 0.5 to 1.3 weight %, Cr: 1.0 to 3.0 weight %, Si, Mo and Mn total content of 1.0 to 3.0 weight %, unavoidable impurities and the remaining part being Fe, where at least hardening and tempering at a temperature of 200° C. or greater are performed on the outer race as hardening heat treatment; and the low carbon steel of the inner race preferably has the composition C: 0.1 to 0.4 weight %, Cr: 1.0 to 3.0 weight %, unavoidable impurities and the remaining part being Fe, where carbonitriding, followed by hardening and tempering are performed on the inner race as hardening heat treatment.

Moreover, preferably the outer race further undergoes carbonitriding before the hardening and tempering at a temperature of 200° C. or greater as the hardening heat treatment, and preferably the low carbon steel of the inner race has the composition C: 0.1 to 0.4 weight %, Cr: 1.0 to 3.0 weight %, total content of Si, Mo and Mn of 1.0 to 3.0 weight %, unavoidable impurities and the remaining part being Fe, wherein tempering in the hardening heat treatment is performed at a temperature of 200° C. or greater.

Furthermore, preferably a convex section is formed on the cylindrical convex surface of the support beam section, a groove is formed in the concave section of the outer race, and together with fitting the convex section with the groove, a thrust bearing is provided between the convex section and the groove.

With the present invention constructed as described above, a toroidal continuously variable transmission having adequate durability can be achieved.

In other words, in the case of the toroidal continuously variable transmission of the present invention, the concave section formed in the outside surface of the outer race of a thrust rolling bearing has a shape provided with a pair of side surface sections on both sides in the width direction, and preferably a gothic arch shape in cross section provided with a pair of side concave curved surface sections, so the inner surface of this concave section (side surface sections on both sides, or the concave curved surface sections on both sides) and the cylindrical convex surface that is formed on the support beam section of the trunnion preferably come in contact at two locations in the circumferential direction of these surfaces. Therefore, it is possible to maintain the contact surface area on both surfaces, as well as suppress wear of these surfaces.

Moreover, both surfaces come in contact at two locations that are separated in the circumferential direction of these surfaces, so even when a large thrust load is applied to the outer race, the outer race can be kept from elastically deforming in the direction narrowing the width of the opening of this concave section. Therefore, the interval between the outer race track formed on the inside surface of the outer race and the inner race track formed on the outside surface of the power roller is kept from becoming uneven in the circumferential direction of these tracks. Consequently, it is possible to keep the surface pressure at the area of rolling contact between these tracks and the rolling bodies (balls) from becoming partially excessive. As a result, it is possible to maintain durability of the thrust rolling bearing, as well as maintain the durability of the toroidal continuously variable transmission in which the thrust rolling bearing is assembled.

Furthermore, by smoothly connecting the edges on the ends on the center side of both side concave curved surface sections and edges on both sides of the center concave curved surface section, it is possible to reduce stress that is applied at or near the bottom section of the concave section due to pressure between the inner surface of the concave section and the cylindrical convex surface of the support beam section, even when a large force is applied in a direction that would separate both side concave curved surface sections from each other. As a result, it is possible to prevent damage such as cracking from occurring to the outer race.

In addition, in the construction of the preferred embodiment of the present invention that increases the rigidity of the trunnion by eliminating the need for forming a circular hole in the trunnion by transmitting the tangential force that acts on the power roller by the outer peripheral surface of the outer race of the thrust rolling bearing of the power roller and the contact section of the trunnion that faces and comes in contact with the outer peripheral surface, the durability of this portion is improved by preventing an increase in stress in the area between the outer peripheral surface of the outer race and outer race track groove in the range of the depth of the track groove formed on the inside surface of the outer race.

Moreover, in the preferred embodiment of the present invention, the effects due to friction of the trunnion sliding against the yokes is prevented, thus together with being able to prevent wear of the trunnion, it is possible to reduce the processing cost of the trunnion.

Furthermore, with the preferred embodiment of the present invention, construction is such that large bending stress does not act on the outer race, and the amount of heat generated by the thrust rolling bearing is greater on the outer race side than the inner race side; and by forming the power roller in which large bending stress acts using steel having high toughness, and forming the outer race of a high carbon steel having high heat resistance, it is possible to improve the durability of the thrust rolling bearing, including the power roller.

In another preferred embodiment, a convex section is formed on the cylindrical convex surface of the support beam section of the trunnion, and a groove is formed in the concave section on the outside of the power roller, where by providing a needle bearing between the convex section and groove, it is possible to easily position the power roller in the axial direction with respect to the trunnion, and to reduce pivotal resistance of the power roller.

BRIEF DESCRIPTION OF THE DRAWINGS

FIG. 32A illustrates the state before a thrust load is applied from the power roller to the thrust ball bearing, and FIG. 32B illustrates the state after a thrust load has been applied.

DETAILED DESCRIPTION OF THE PREFERRED EMBODIMENTS

Embodiment 1

Figure 1:
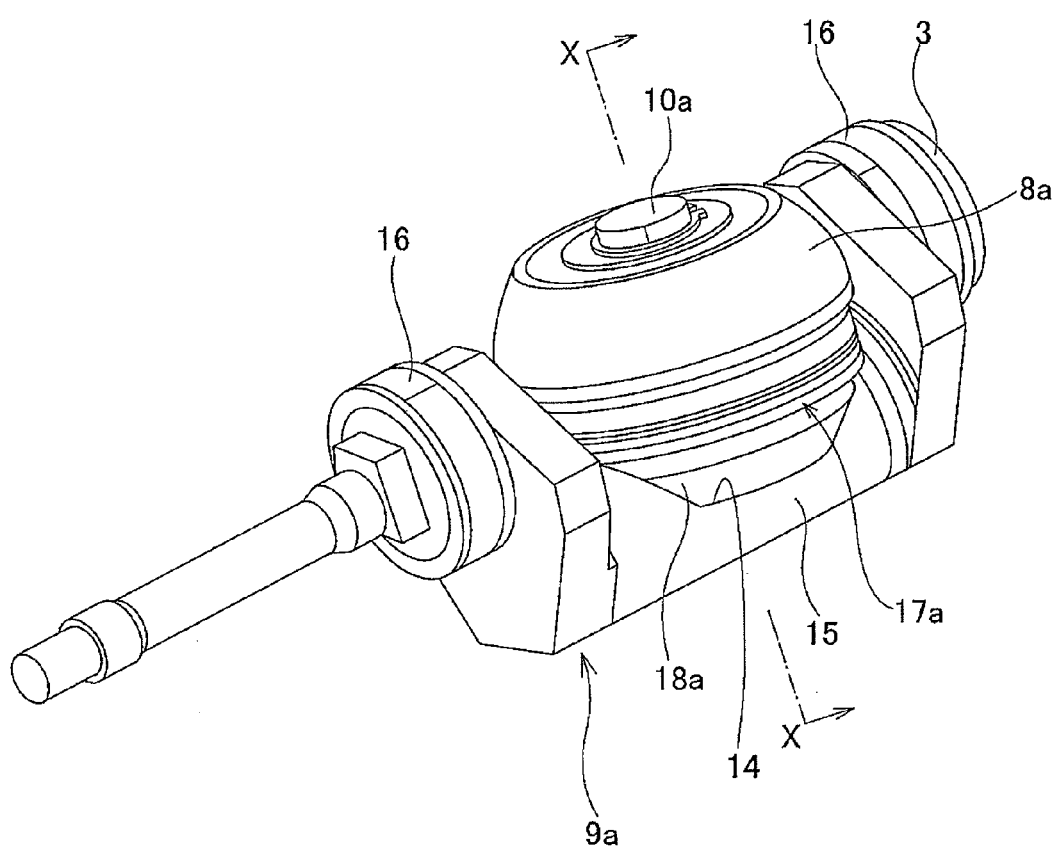
FIG. 1 illustrates a first embodiment of the present invention, and is a perspective drawing of a trunnion that supports a power roller by way of a thrust ball bearing as seen from the inside in the radial direction of the disks.
Figure 2:
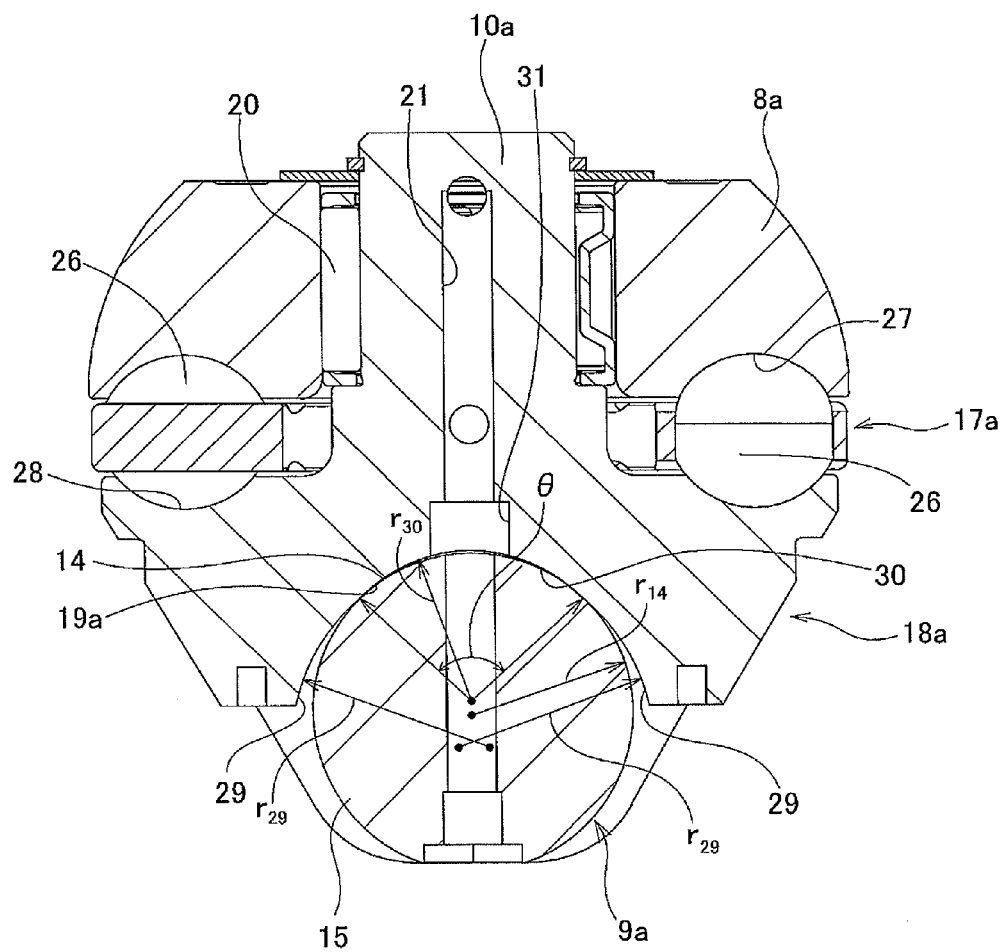
FIG. 2 is an enlarged cross-sectional drawing of section X-X in FIG. 1.
Figure 3:
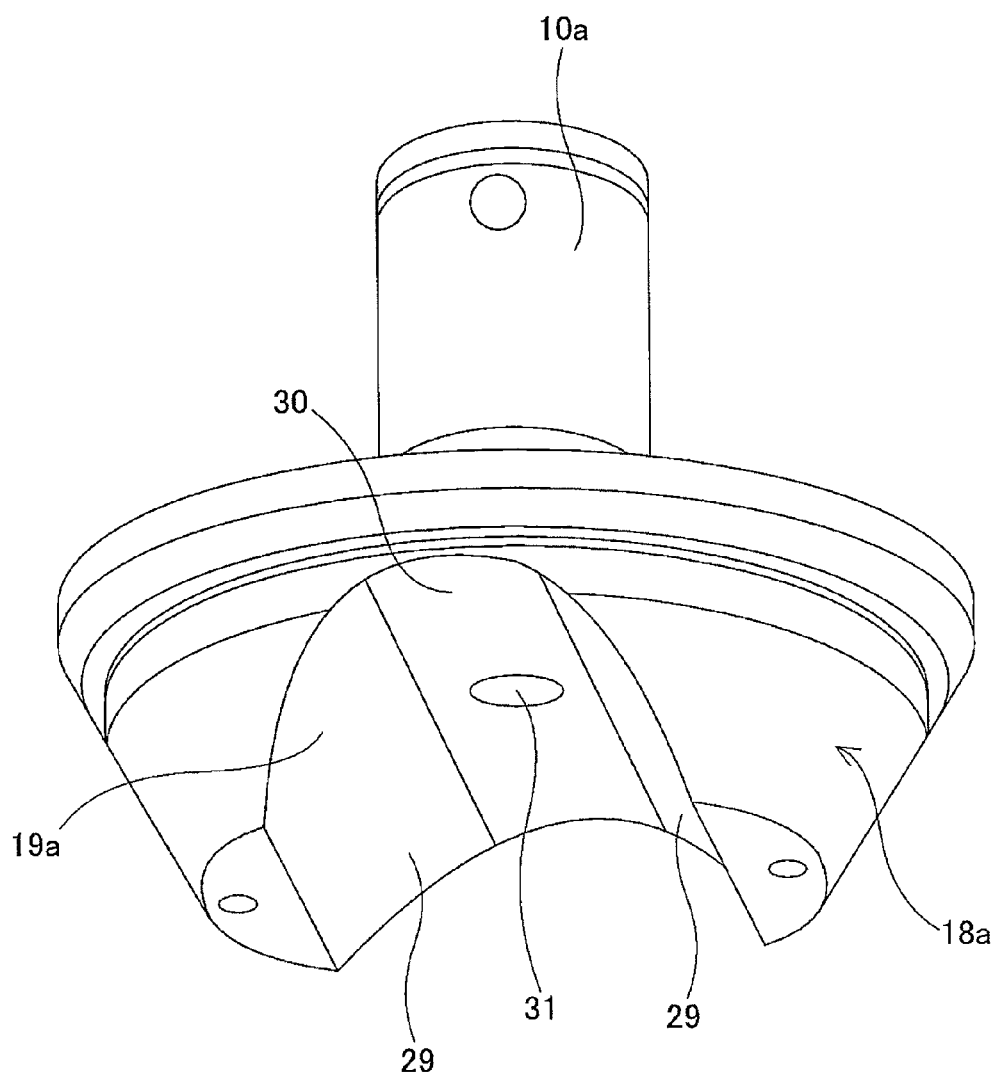
FIG. 3 is a perspective drawing of the removed outer race of the thrust ball bearing in a state as seen from the opposite side of that in FIG. 1.
Figure 4:
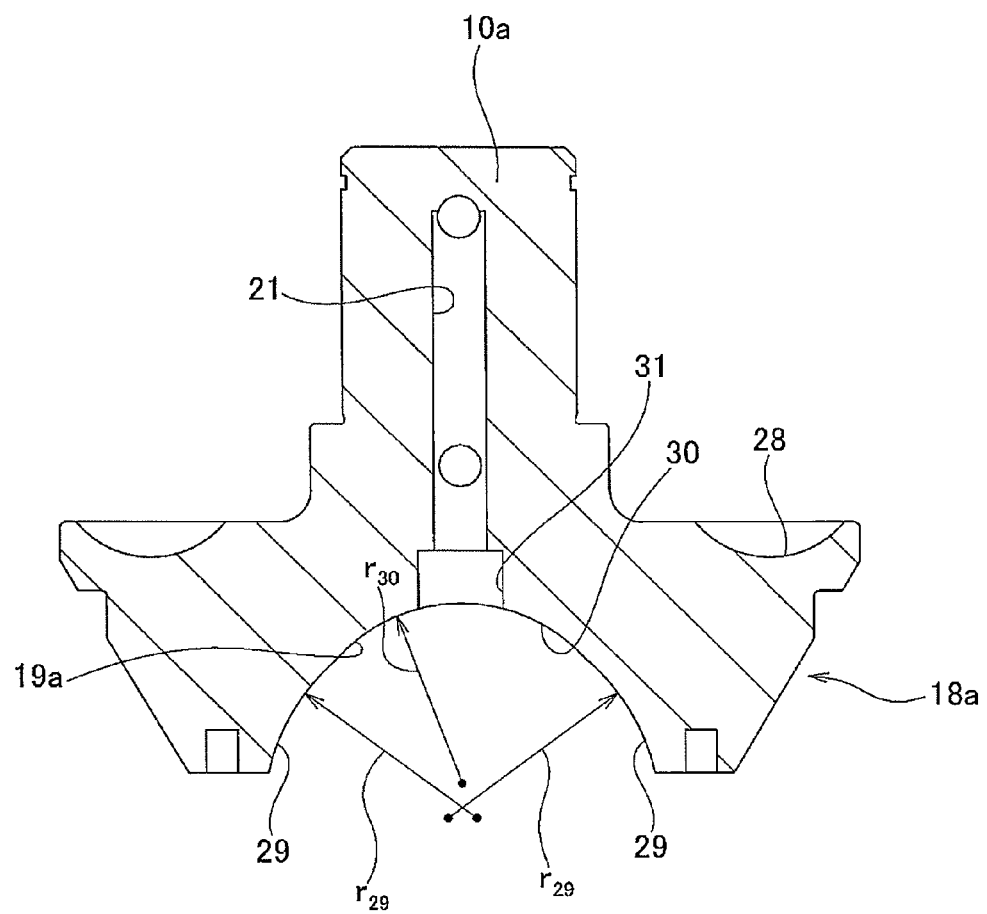
FIG. 4 is a drawing illustrating the state of the removed outer race of the thrust ball bearing in FIG. 2.

FIGS. 1 to 4 illustrate a first embodiment of the present invention. The feature of this embodiment is the maintaining of the durability of an outer race 18a and the thrust ball bearing 17a that comprises this outer race 18a by contriving a design for the shape of the inner surface of a concave section 19a that is formed on the outside surface of the outer race 18a in the radial direction of this outer race 18a. The construction and function of the other parts are the same as those of the second example of conventional construction illustrated in FIGS. 27 to 33 and described above, so the same reference numbers are given to identical parts, and any redundant explanation will be simplified or omitted, such that the explanation below can center on the features of this embodiment.

In the construction of this embodiment, the inner surface of the concave section 19a above is not a simple cylindrical surface, but rather has a Gothic arch shaped cross section that is formed by smoothly connecting a pair of side concave curved surface sections 29 with a center concave curved surface section 30. Of these sections, both side concave curved surface sections 29 are provided on both side sections in the width direction of the concave section 19a such that the radius of curvature of the cross-sectional shape r29 is greater than the radius of curvature r14 of the outer peripheral surface of a cylindrical convex surface 14 of a support beam section 15 of a trunnion 9a (r29>r14). On the other hand, the center concave curved surface section 30 is provided in the center section in the width direction of the concave section 19a such that the radius of curvature of the cross-sectional shape r30 is less than the radius of curvature r14 of the outer surface of the cylindrical convex surface 14 (r30<r14). Both side concave curved surface sections 29 and center concave curved surface section 30 having radii of curvature r29, r30 as described above are smoothly connected by having the edges of the ends on the center sides of both side concave curved surface sections 29 share the tangent line with the edges of the ends on both sides of the center concave curved surface section 30

The outer race 18a and trunnion 9a are assembled such that the support beam section 15 on the trunnion 9a side fits inside the concave section 19a on the outer race 18a side. In this assembled state, the cylindrical convex surface 14 of the support beam section 15 and both side concave curved surfaces sections 29 come in contact at two positions in the circumferential direction of this support beam section 15. The center angle θ of both of these contact areas can be arbitrarily adjusted based on the ratios of the radii of curvature r29, r30 and r14. The larger this center angle θ becomes, the larger the effect of preventing elastic deformation of the outer race 18a as illustrated in FIG. 32B and described above becomes. However, the larger this center angle θ becomes, the larger the force applied in the direction of enlarging the space between both side concave curved surface sections 29 becomes, and thus the tensile stress acting on or near the bottom section of the concave section 19a becomes large. On the other hand, the smaller this center angle θ becomes, the force applied in the direction enlarging the space between both side concave curved surface sections 29 is suppressed, and thus the tensile stress acting on or near the bottom section of the concave section 19a can be decreased. However, the smaller this center angle θ becomes, the smaller the effect of preventing elastic deformation of the outer race 18a as illustrated in FIG. 32B and described above becomes. Therefore, the center angle θ is suitably regulated within a range such that elastic deformation of the outer race 18a is suppressed and such that the tensile stress acting on or near the bottom section of the concave section 19a does not become excessively large. More specifically, the ratios of the radii of curvature r29, r30 and r14 are set so that the center angle θ is kept within the range 90 degrees±30 degrees.

With the construction of this embodiment, the inner surface of the concave section 19a that is formed on the outside surface of the outer race 18a of the thrust ball bearing 17a comes in contact with the cylindrical convex surface 14 of the support beam section 15 at two positions in the circumferential direction of these surfaces. Therefore, it is possible to maintain the contact surface area between the inner surface of the concave section 19a and the cylindrical convex surface 14, to keep the surface pressure at both of these contact areas low and to suppress wear of both surfaces.

Moreover, the inner surface of the concave section 19a and the cylindrical convex surface 14 come in contact at two positions that are separated in the circumferential direction of the support beam section 15, so even though a large thrust load is applied to the outer race 18a, elastic deformation of the outer race 18a is suppressed so that the inside surface side becomes a convex cylindrical surface as illustrated in FIG. 32B and described above. In other words, the height of the inside surface of the outer race 18a is such that it does not change in the circumferential direction. Therefore, the space between the outer race track 28 formed on the inside surface of this outer race 18a and the inner race track 27 formed on the outside surface of the power roller 8a is suppressed from becoming uneven in the circumferential direction of these tracks 28, 27. That is, this interval can essentially be kept constant. Therefore, the surface pressure at the area of rolling contact between both of these tracks 28, 27 and the rolling surface of the balls 26 can be prevented from becoming excessively large in part.

Furthermore, in the case of the construction of this embodiment, the edges on the ends of the center sides of both side concave curved surface sections 29 and the edges on the ends of both sides are smoothly connected, so as the cylindrical convex surface 14 of the support beam section 15 presses against these sections, the tensile stress acting on or near the bottom section of the concave section 19a can be reduced even when a large force is applied in the direction separating the space between both side concave curved surface sections 29. As a result, it is possible to prevent damage such as cracking of the outer race 18a from occurring. In addition, provided with a center concave curved surface section 30, the tensile stress acting on or near the bottom of the concave section 19a is reduced, and therefore the center angle θ can be increased under the condition that the damage prevention performance of the outer race 18a is in the same range.

Moreover, by increasing this center angle θ, the effect of suppressing elastic deformation of the outer race 18a can be made large.

In this embodiment, the inner surface of the concave section 19a of the outer race 18a is not limited to a Gothic arch shaped cross section wherein a pair of side concave curved surface sections 29 are smoothly connected to a center concave curved section 30. For example, a Gothic arch shape cross section may also include a pair of arc shapes, not having the same center, that connect at an apex, or in other words, construction comprising only a pair of side concave curved surface section with no center concave curved surface section also corresponds to a concave section having a Gothic arch shaped cross section.

Furthermore, as long as construction is such that the inner surface of the concave section 19a of the outer race 18a has side surface sections on both sides in the width direction, and the cylindrical convex surface 14 of the support beam section 15 comes in contact with both side surface sections of the outer race 18, the cross-sectional shape is not particularly limited. In other words, in the present invention, as long as the inner surface of the concave section 19a of the outer race 18a comes in contact with the cylindrical convex surface 14 of the support beam section 15 at two points, and a space is formed between the outer race 18a and trunnion 9a, the effect of the present invention can be obtained.

Figure 5:
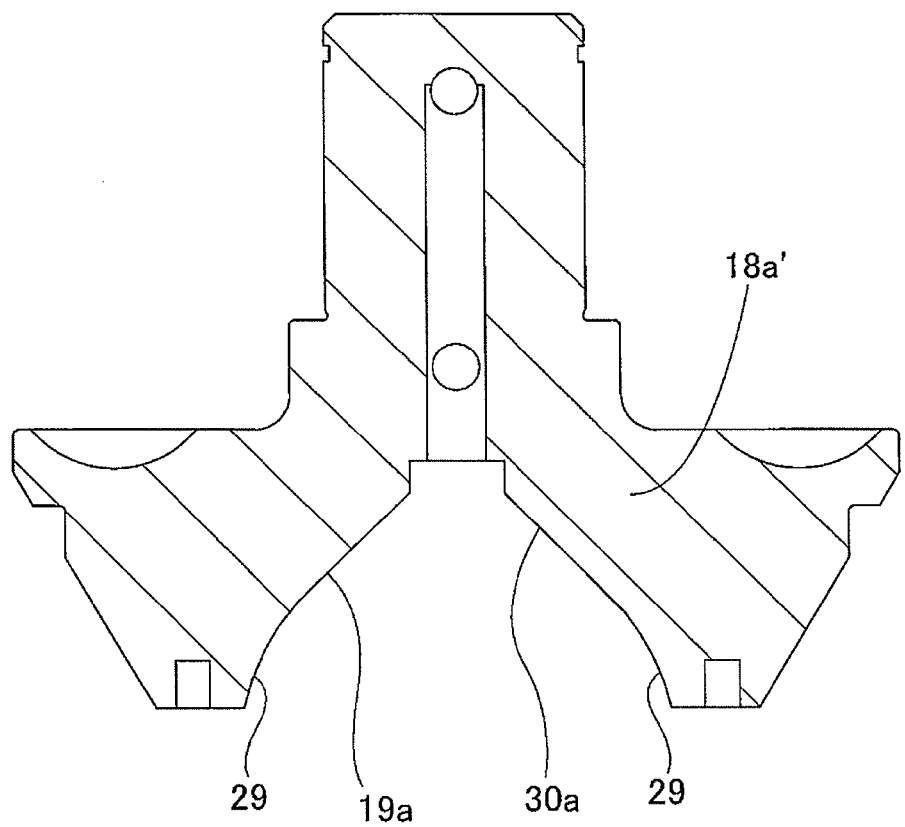
FIG. 5 is a drawing similar to FIG. 4, and illustrates an example of an outer race of which the shape of the inner surface of the concave section has been changed.
Figure 6:
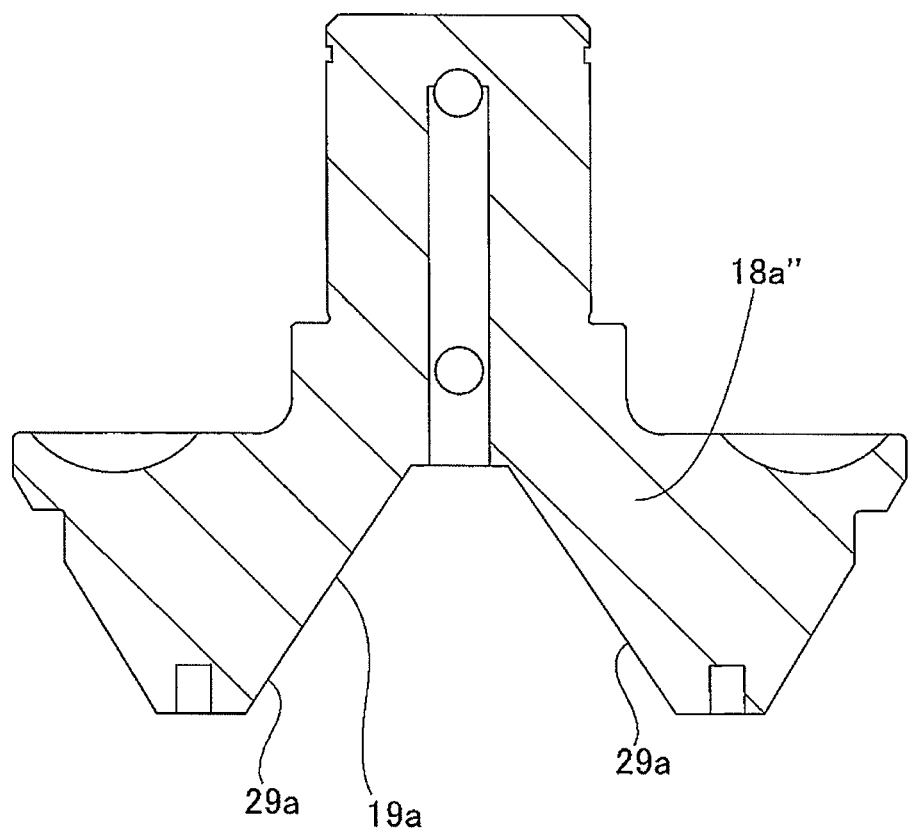
FIG. 6 is a drawing similar to FIG. 4, and illustrates another example of an outer race of which the shape of the inner surface of the concave section has been changed.

For example, as in the outer race 18a' illustrated in FIG. 5, the inner surface of the concave section 19a can be such that side concave curved surface sections 29 that are formed on both sides in the width direction are connected to a center flat surface section 30a having a straight cross section that is formed in the center section between both side concave curved surface sections 29, or as in the outer race 18a" illustrated in FIG. 6, the inner surface of the concave section 19a can be formed from just a pair of side flat surface sections 29a having a straight cross section that are formed on both sides in the width direction.

Embodiment 2

Next, a second embodiment of the present invention is explained. The feature of the toroidal continuously variable transmission of this embodiment is construction that transmits a tangential force that acts on the power roller by the outer peripheral surface of the outer race and the point of contact where the trunnion comes in contact with the outer peripheral surface of the outer race, while the other construction and function are the same as the construction and function of the first embodiment and conventional construction. Therefore, needless to say, the explanation will center on the featured parts of this embodiment, and for other parts, the same reference numbers as those used in FIGS. 1 to 6 and FIGS. 26 to 33 will be used to simplify the explanation.

Figure 7:
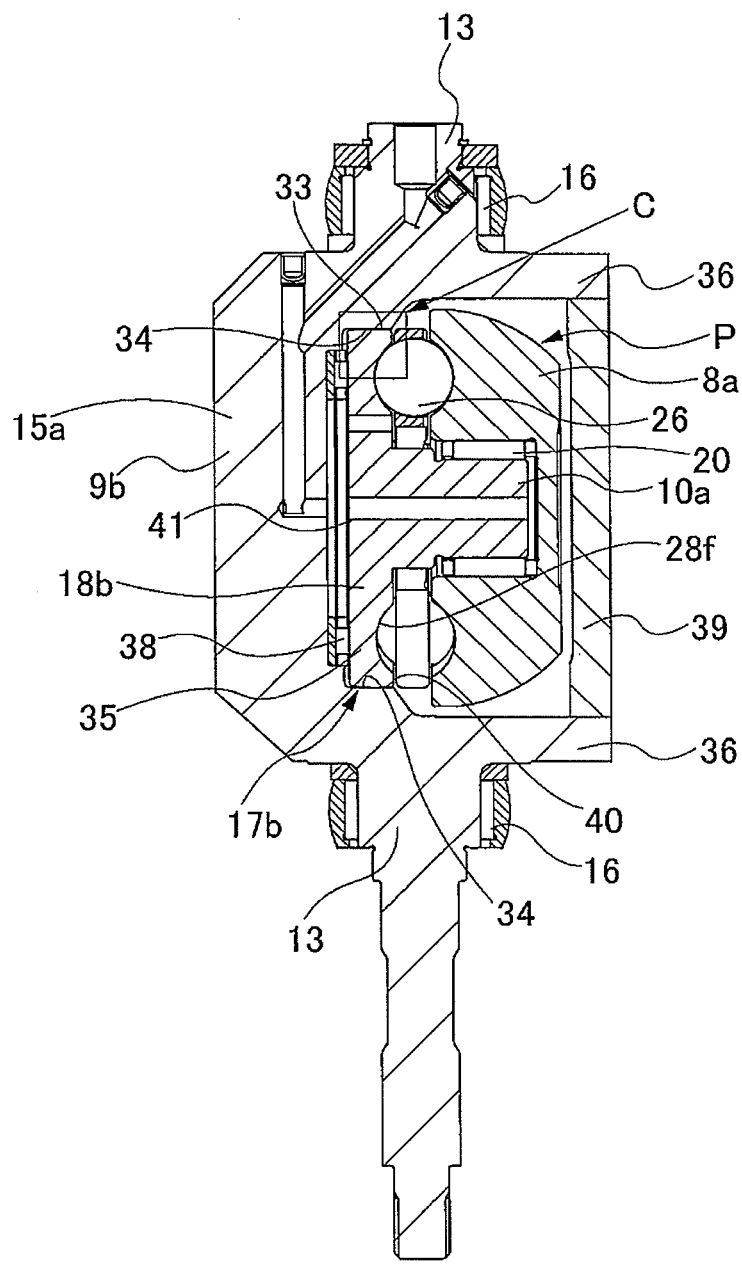
FIG. 7 is a cross-sectional drawing illustrating a trunnion that comprises a power roller of a toroidal continuously variable transmission of a second embodiment of the present invention.
Figure 8:
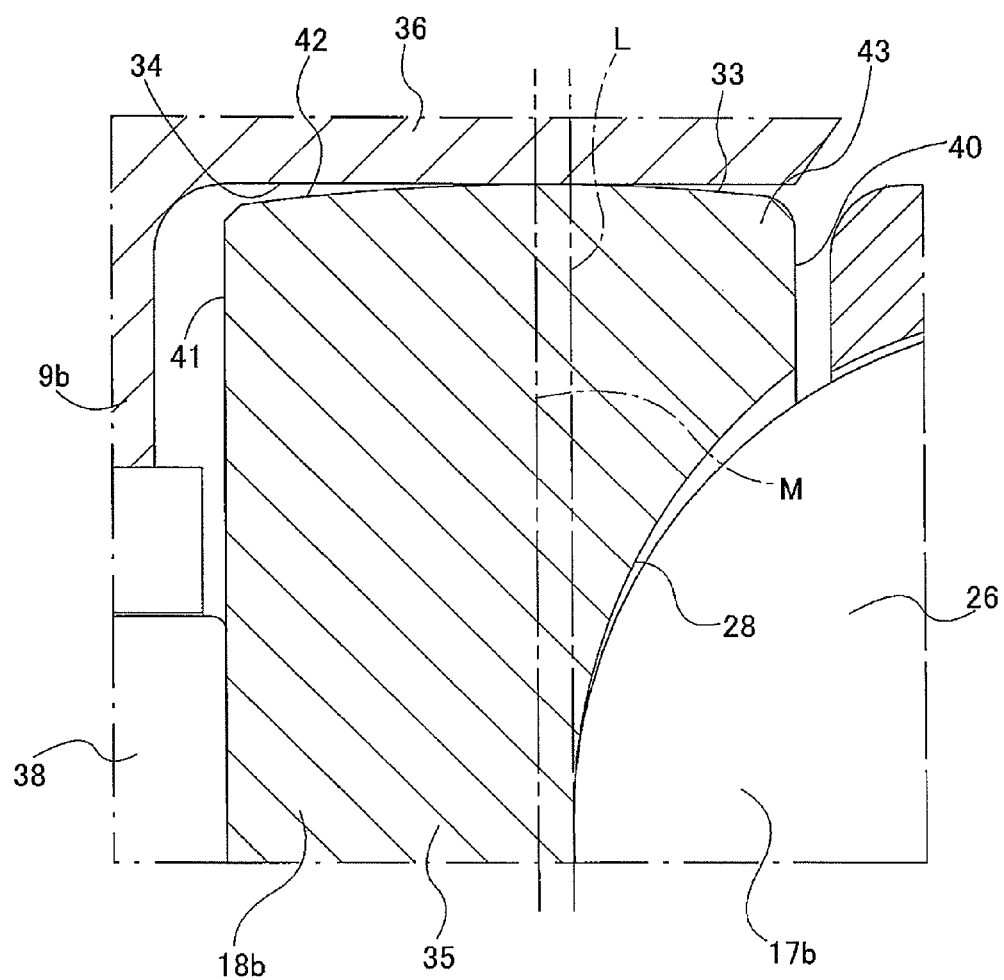
FIG. 8 is an enlarged view of the rectangular section C in FIG. 7.

As illustrated in FIG. 7 and FIG. 8, in the toroidal continuously variable transmission of this embodiment, as in the first embodiment, by using construction that transmits tangential force acting on the power roller 8a by the outer peripheral surface 33 of the outer race 18b and the point of contact 34 where the trunnion 9b comes in contact with the outer peripheral surface 33 of that outer race 18b, there is no need for construction as used in the first example of conventional construction having a base side section of a support shaft 10, a circular hole in the trunnion 9 into which the base side section of the support shaft 10 is inserted, and a radial needle bearing between them.

In addition, the outer race 18b comprises a circular disk shaped main outer race section 35 that forms the outer race of the thrust ball bearing 17b, and a support shaft 10a that extends perpendicularly from the center of the inside surface of this main outer race section 35 and supports the power roller 8a so that it can rotate. The main outer race section 35 has an outer peripheral surface 33 that is concentric with the center axis of rotation of the power roller 8a, or in other words, the center of rotation of the support shaft 10a.

The outer race 18b is housed inside a concave shaped pocket section P on the inside of the trunnion 9b, and a pair of flat contact sections (contact surfaces on the trunnion side) are formed in the trunnion 9b at positions that face the outer peripheral surface 33 of the main outer race section 35, and are such that they face each other and extend along a direction that is orthogonal and skew to the center axis of rotation of the power roller 8a. To explain this in more detail, the pair of contact sections 34, together with being orthogonal to the center axis of rotation (axis of rotation) of the power roller 8a, extends in a direction that is orthogonal to the tilt shafts 13. In other words, the contact sections 34 extend in the front-to-back direction of FIG. 7. Each contact section 34 is formed from the nearly square flat tip end surface (front surface) of a protruding section that protrudes in a nearly square plate shape inward from the inside surface of the base end section of a bent curved wall section of both end sections 36 of the trunnion 9b.

Each contact section 34 is formed in the center section in the direction along the center axis of rotation of the disks 1a, 1b, 6 of the bent curved wall section on both end sections 36 of the trunnion 9b. Each contact section 34 has been hardened to a high hardness by high-frequency hardening for example, and has been processed to have high surface roughness by grinding. The space between these contact sections 34 is set to be a little larger than the outer diameter dimension of the main outer race section 35.

Preferably, at least one of the contact sections 34 and outer surface 33 of the main outer race section 35 of the outer race 18b has undergone processing to reduce the friction coefficient. The process for reducing the friction coefficient can be, for example, a process of forming a film such as polytetrafluoroethylene (PTFE) or molybdenum disulfide ($MoS_2$) on at least one of the contact sections 34 and outer surface 33 of the main outer race section 35.

The concave shaped pocket section P that is formed by the inside surface of the support beam 15a of the trunnion 9b and both end sections 36 is a housing space that houses the outer race 18b and power roller 8a, where of this housing space, the dimension in the direction along the pivot axis of the outer race housing space that houses the outer race 18b (space between inside surfaces on the based end section side of the both end sections 36 that face each other) is set to be less than the dimension in the direction along the pivot axis of the power roller housing space that houses the power roller 8a (space between inside surfaces further on the tip end side than the base end section of both end sections 36 that face each other). In other words, by having the inside surface of the base end section of the bent curved wall section on both end sections 36 protrude inward as described above, this surface comes very close to the outer peripheral surface 33 of the main outer race section 35, and this portion becomes the nearly flat contact sections 34.

In addition, in this embodiment, a thrust needle bearing 38 that supports the load in the thrust direction (direction facing toward the large end surface side from the small end surface side of the power roller 8a) that is applied to the power roller 8a is installed between the trunnion 9b and the main outer race section 35.

Furthermore, a radial rolling bearing 20 is installed between the support shaft 10a and the power roller 8a, and a beam (connecting piece) 39 is formed so that it bridges between the tip end sections of both end sections 36. The beam 39 deforms due to a normal force that act on the power roller 8a so that the center section of the support beam section 15a of the trunnion 9b becomes convex on the opposite side from the power roller 8a, and this beam 39 prevents the tip end sides of both end sections 36 from deforming in a direction toward each other. Through the use of this beam 39, together with not having to form a circular hole in the trunnion 9b, deformation of the trunnion can be prevented, however, construction without the beam 39 is also possible.

Therefore, in this construction, when the tangential force acts in the radial direction (direction along the tilt shafts 13 of the trunnion 9b) on the power roller 8a, the power roller 8a displaces to the side of one of the tilt shafts 13, and as this happens, the outer peripheral surface 33 of the main outer race section 35 is pressed toward one of the contact sections 34 of the trunnion 9b. In addition, the main outer race section 35 can rotate above this contact section 34. In other words, the main outer race section 35 (power roller 8a) can move in the direction orthogonal to the center axis of rotation of the power roller 8a, as well as in the direction orthogonal to the tilt shafts 13 (direction along the center axis of rotation of the disks 1a, 1b, 6) with respect to the trunnion 9b.

Moreover, as illustrated in FIG. 8, in the outer peripheral surface 33 of the main outer race section 35 that comes in contact with the flat shaped contact sections 34 that are formed on the inside surface of the base end sections of both end sections 36 of the trunnion 9b, formed is a crowned surface 42 that is high in the middle between an inside surface 40 that is the power roller 8a side (inner race side of the thrust ball bearing 17b) of the main outer race section 35 (outer race 18b) and an outside surface 41 on the opposite side of the power roller 8a.

Furthermore, the position of the apex, which is the furthest point on the outer perimeter of this crowned surface 42, or in other words, the position closest to the contact section 34 is located further on the outside surface 41 side than the deepest position of the track groove (ball groove) 28f that is formed on the inside surface 40 of the main outer race section 35 (outer race 18b).

The dot dash line L indicates the position along the direction of the axis of rotation of the power roller 8a of the deepest position in the track groove 28f, and the dot dash line M indicates the position along the direction of the axis of rotation of the power roller of the apex. Moreover, the position of the apex of the crowned surface 42 is not illustrated as a point, but exists around the entire perimeter of the outer peripheral surface 33 of the main outer race section 35, and the position of the apex of the crowned surface 42 is also a ring shaped line that is around the entire perimeter of the crowned surface 42.

As illustrated by the dot dash line L and dot dash line M, the apex of the crowned surface 42 is positioned further on the outside surface 41 side of the main outer race section 35 than the deepest position of the track groove 28f with respect to the direction along the axis of rotation of the power roller 8, and therefore the section where the track groove 28f exists and the position of the apex of the crowned surface 42 do not overlap with regard to this direction.

In addition, in the contacts sections 34 of the trunnion 9b and the crowned surface 42 of the outer peripheral surface 33 of the main outer race section 35, the apex position and its surroundings are the range of possibilities of contact between them, and therefore there is a high possibility that the contact position between the contact section 34 and crowned surface 42 will be located further on the outside surface 41 side than the deepest position of the track groove 28f with respect to the direction along the axis of rotation of the power roller 8a.

Moreover, even though the contact position between the contact section 34 and crowned surface 42 is located further on the inside surface 40 side than the deepest position of the track groove 28f with respect to the direction along the axis of rotation of the power roller 8a, the contact position is located at a portion which corresponds to the deep positions of the track groove 28f, and does not correspond to the shallow positions of the track groove 28f.

Therefore, when the contact section 34 comes in contact with the crowned surface 42, and the tangential force acting on the power roller 8a is transmitted to the trunnion 9b, it is possible to prevent an increase in stress at the area between the outer peripheral surface 33 of the main outer race section 35 and the track groove 28f which is within the depth range of the track groove 28f with respect to the direction along the axis of rotation of the power roller 8a, in particular, at the corner 43 between the outer peripheral surface 33 and the inside surface 40 of the main outer race section 35.

By this structure, it is possible to make the outer race 18b more lightweight and compact, and as the outer race 18b becomes more lightweight and compact, it becomes possible to make the trunnion 9b more lightweight and compact. In addition, because of this, it becomes possible to make the entire transmission more lightweight and compact.

Furthermore, by preventing an increase in stress at the corner 43 adjacent to the track groove 28f of the main outer race section 35, it is possible to prevent deformation of the track groove 28f from occurring. This makes it possible to prevent an increase in rotation resistance of the rolling bodies (balls) 26 due to deformation of the track groove 28f, and to prevent a decrease in transmission efficiency of the entire transmission.

Embodiment 3

Figure 9:
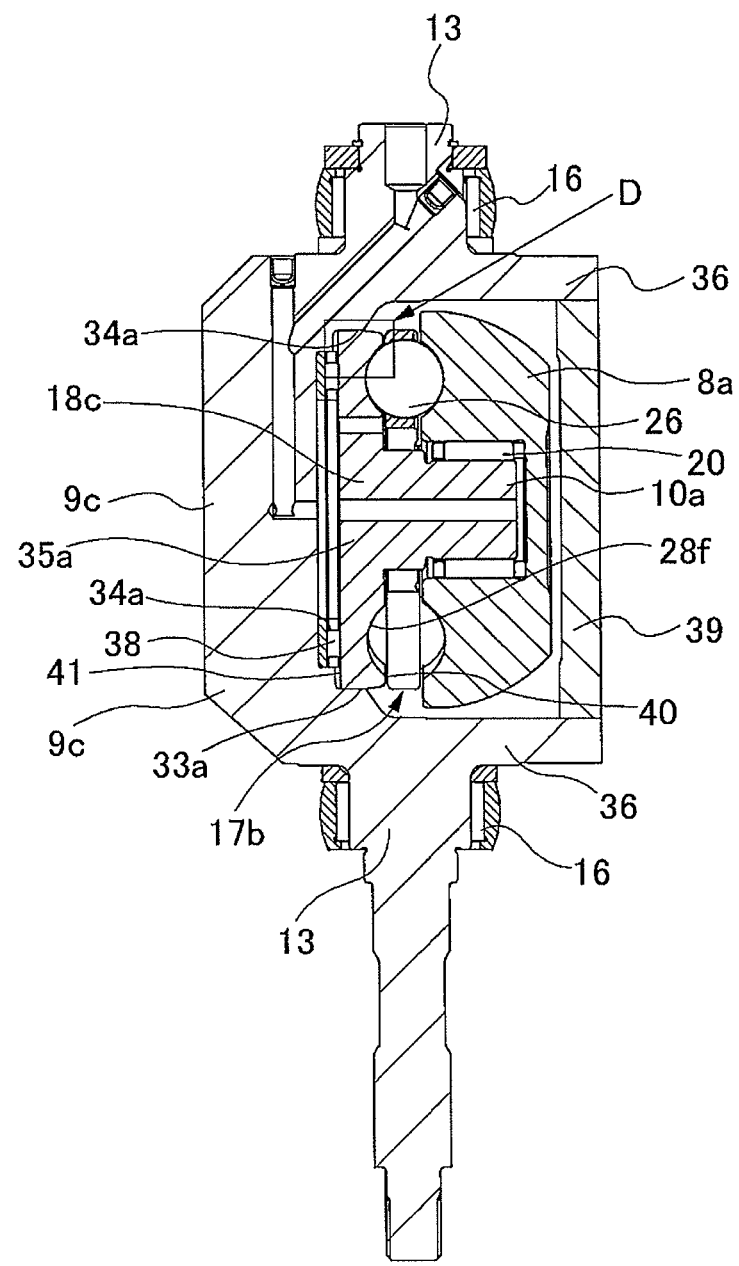
FIG. 9 is a cross-sectional drawing illustrating a trunnion that comprises a power roller of a toroidal continuously variable transmission of a third embodiment of the present invention.
Figure 10:
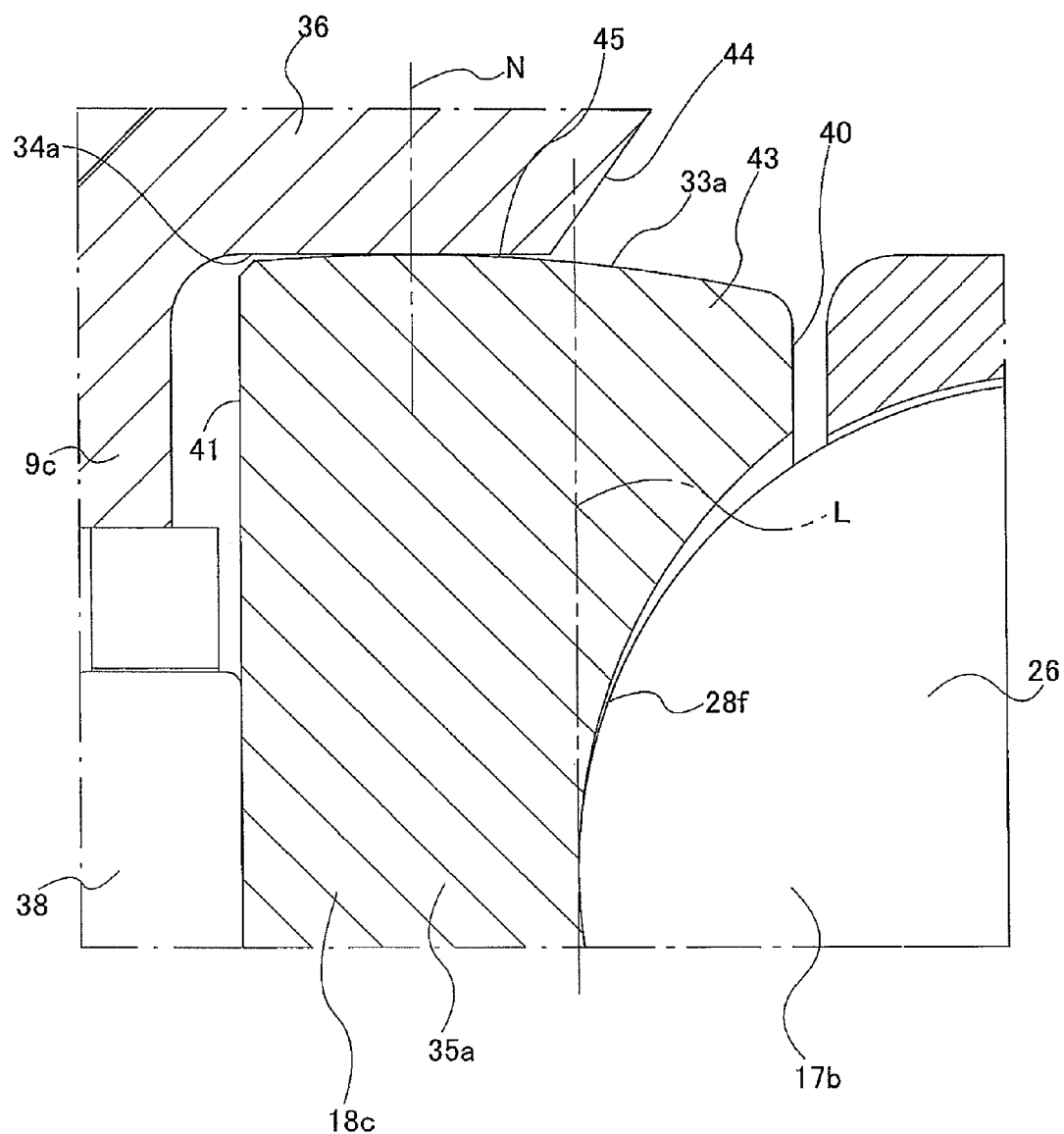
FIG. 10 is an enlarged view of the rectangular section D in FIG. 9.

Next, a third embodiment of the present invention is explained. As illustrated in FIG. 9 and FIG. 10, in this embodiment, the width of the contact sections 34a of the trunnion 9c that comes in contact with the outer peripheral surface 33a of the main outer race section 35a along the direction of the axis of rotation of the power roller 8a, in other words, the width in the thickness direction from the inside surface 40 to the outside surface 41 of the main outer race section 35, is formed such that it becomes more narrow than that of the contact sections 34 of the second embodiment.

That is, in the second embodiment, the contact sections 34 are formed so that they cover the entire surface of the width in the thickness direction of the outer peripheral surface 33 of the main outer race section 35, however, in this third embodiment, construction is such that the contact sections 34 are formed only in the part from a little more on the inside surface 40 side than the center section between the outside surface 41 and the inside surface 40 of the main outer race section 35a to the outside surface 41, and there is no contact section at the position that faces the outer peripheral surface 33a on the inside surface 40 side of the main outer race section 35a.

Moreover, the space between inside surfaces of both end sections 36 of the trunnion 9c that face each other is narrow at the position of the contact sections 34a at the base end sections of both end sections 36, and becomes wider than the space between the contact sections 34a at positions further on the tip end sides than the contact sections 34a.

Therefore, the positions further on the tip end sides of both end sections 36 than the contact sections 34a are located at positions that are separated from the outer peripheral surface 33a of the main outer race section 35a, and the area on the inside surface side of the outer peripheral surface 33a of the main outer race section 35a cannot come in physical contact with the inside surfaces of both end sections 36 of the trunnion 9c. A step 44 is formed respectively between the contact sections 34a where the space between inside surfaces of both end sections 36 is narrow and the positions further on the tip end side where the space inside surfaces of both end sections 36 is wide.

In addition, an outer race side contact surface 45 that comes in contact with the contact sections 34a of the trunnions 9c is formed on the outer peripheral surface 33a of the main outer race section 35a.

The position of the outer race side contact surface 45 and contact sections 34a with respect to the direction along the axis of rotation of the power roller 8a is further on the outside surface 41 side of the main outer race section 35a than the deepest position of the track groove 28f that is formed on the main outer race section 35a.

In other words, the outer race side contact surface 45 and the contact sections 34a that come in contact with that outer race side contact surface 45, and the depth range of the track groove 28f that is formed on the inside surface 40 side of the main outer race section 35a do not overlap with each other with respect to the direction along the center axis of rotation of the power roller 8a, and the position of the outer race side contact surface 45 and the contact sections 34a is located in the deeper side than the track groove 28f with respect to the depth direction of the track groove 28f.

Moreover, the outer peripheral surface 33a of the main outer race section 35a has a crowned surface that becomes high in the middle between the inside surface 40 and outside surface 41. The position of the apex, which is the outermost side of the outer peripheral surface 33a that is the crowned surface, is located on the outer peripheral surface 33a in nearly the center in the direction of the axis of rotation of the power roller 8a of the outer race side contact surface 45 that is further on the outside surface 41 side than the depth position of the track groove 28f as described above.

As in the second embodiment, the dot dash line L indicates the depth position of the track groove 28f along the direction of the axis of rotation of the power roller 8a, and the dot dash line N indicates the position of the apex of the crowned surface along the direction of the axis of rotation of the power roller 8a. The crowned surface is formed around the entire outer peripheral surface 33a, and the position of the apex of the crowned surface is a ring-shaped line section around the entire outer peripheral surface 33a.

Also, the contact sections 34a and the outer race side contact surface 45 contact with each other mainly at the apex section and its surroundings.

In the third embodiment as well, when the contact section 34a comes in contact with the outer race side contact surface 45, and tangential force that acts on the power roller 8a is transmitted to the trunnion, as in the second embodiment, it is possible to prevent an increase in the stress at the portion that is within the depth range of the track groove 28f in the direction along the axis of rotation of the power roller 8a between the outer peripheral surface 33a of the main outer race section 35a and the track groove 28f, in particular, at the corner 43 between the outer peripheral surface 33a and the inside surface 40 of the main outer race section 35a. In the case of this third embodiment, the range where contact is possible between the contact section 34a and the outer peripheral surface 33a of the main outer race section 35a is limited more to the outside side surface side of the main outer race section 35a than in the second embodiment, so it is possible to prevent the increase in stress described above more appropriately.

By this structure, it is possible to make the outer race 18c more lightweight and compact, and based on this lightweight and compact outer race 18c, it becomes possible to make the trunnion 9c more lightweight and compact. In addition, because of this, it becomes possible to make the overall transmission more lightweight and compact.

Furthermore, by preventing an increase in stress at the corner 43 adjacent to the track groove 28f of the main outer race section 35a, it is possible to prevent deformation of the track groove 28f. This makes it possible to prevent an increase in rolling resistance of the rolling bodies (balls) 26 due to deformation of the track groove 28f, and thus it is possible to prevent a decrease in transmission efficiency of the overall transmission.

In this third embodiment as well, construction is possible wherein there is no beam 39. Moreover, in this third embodiment, the range of contact between the outer peripheral surface 33a of the main outer race section 35a and the contact section 34a of the trunnion 9c is such that the width of the contact section 34a along the axial direction of the power roller 8a is made narrow by making alterations to the shape of the inside surface of the base end section side of both end sections 36 of the trunnion 9c, however, it is possible to make the range of contact between the outer peripheral surface 33a of the main outer race section 35a and the contact section 34a of the trunnion 9c narrow by forming a step section between the outside surface side and inside surface side by making the diameter of the inside surface side small with respect to the diameter of the outside surface side.

Furthermore, in the second embodiment and third embodiment, construction is such that the contact section 34, 34a of the trunnion 9b, 9c comes in direct contact with the outer peripheral surface 33, 33a of the main outer race section 35, 35a, however, construction is possible in which a separate member such as a roller bearing is placed between them such that the contact section 34, 34a of the trunnion 9b, 9c comes in indirect contact with the outer peripheral surface 33, 33a of the main outer race section 35, 35a via this separate member. In this case, it is necessary that construction is such that, in the case where the outer peripheral surface 33 of the main outer race section 35 is employed, mainly the apex position and its surroundings of the crowned surface 42 come in contact with the separate member, and in the case where the outer peripheral surface 33a of the main outer race section 35a is employed, the outer race side contact surface 45 comes in contact with the separate member, and that other areas of the outer peripheral surface 33, 33a do not come in contact with the separate member.

The second embodiment and third embodiment were combined with the construction of the first embodiment, and that construction can be suitably applied, however as long as construction is such that the tangential force acting on the power roller is transmitted by the outer peripheral surface of the outer race and the contact sections of the trunnion that come in contact with the outer peripheral surface of the outer race, construction is not limited to that of the first embodiment; for example, the second and third embodiments can be applied to the second and third examples of conventional construction regardless of whether or not a support beam section having a cylindrical convex section is used.

Embodiment 4

Next, a fourth embodiment of the present invention is explained with reference to FIG. 11 to FIG. 17. A feature of the toroidal continuously variable transmission of this embodiment is construction of the area of trunnion which contacts with yokes, while the other construction and function are the same as the construction and function of the other embodiments of the present invention and conventional construction, so needless to say, the explanation will center on only the features of the embodiment, and for other parts the same reference numbers will be used, and any explanation of those parts will be kept brief.

Figure 11:
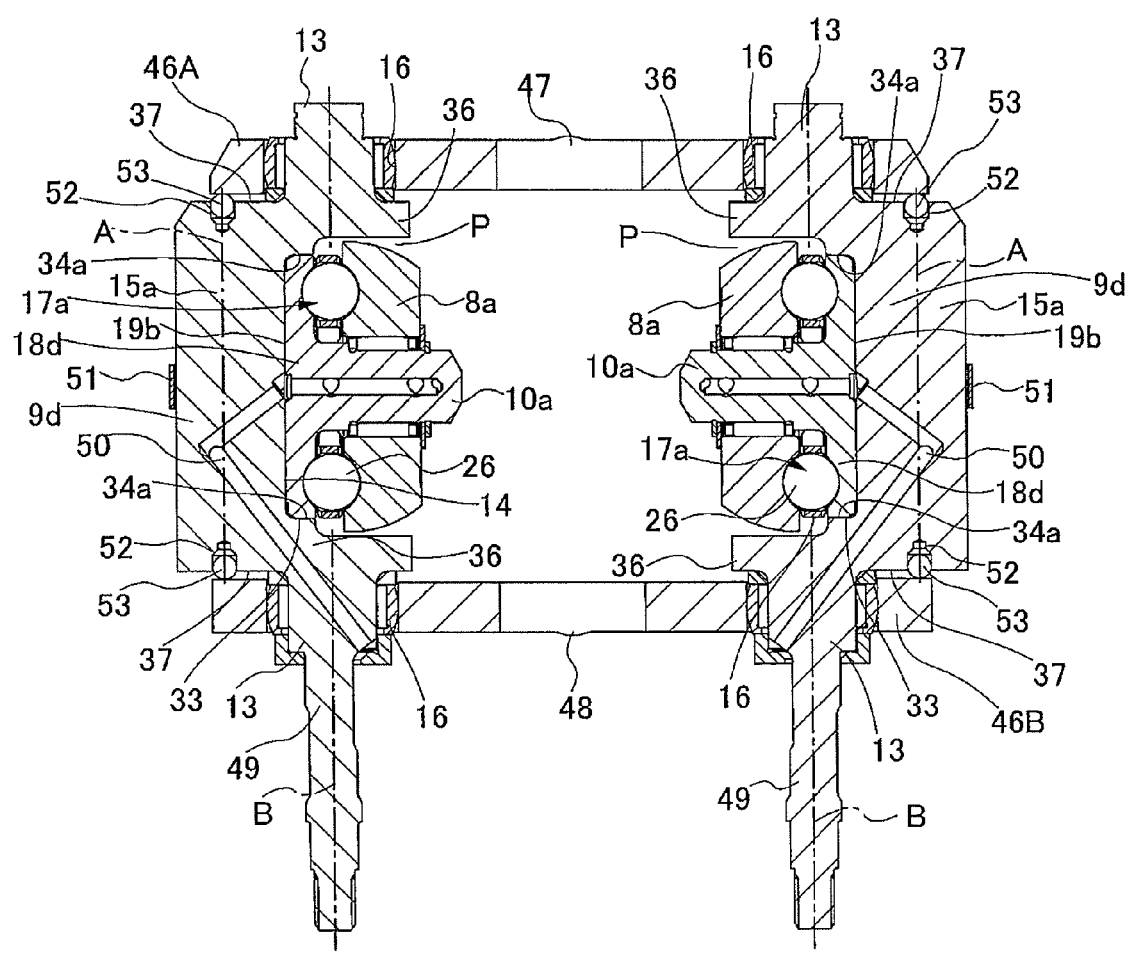
FIG. 11 is a cross-sectional drawing illustrating the major parts of a toroidal continuously variable transmission of a fourth embodiment of the present invention.
Figure 12:
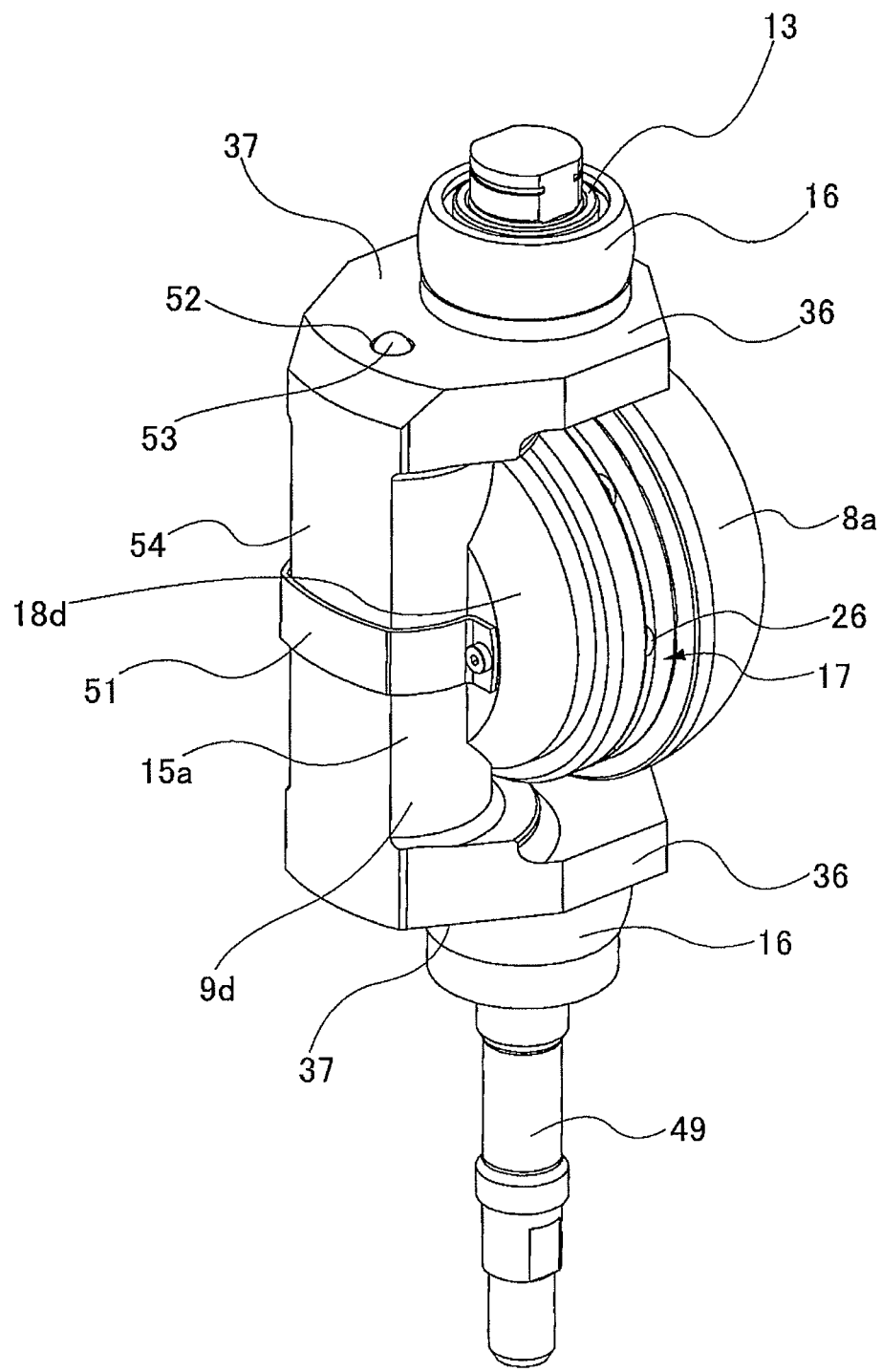
FIG. 12 is a perspective drawing illustrating a trunnion comprising a power roller of the toroidal continuously variable transmission of FIG. 11.
Figure 13:
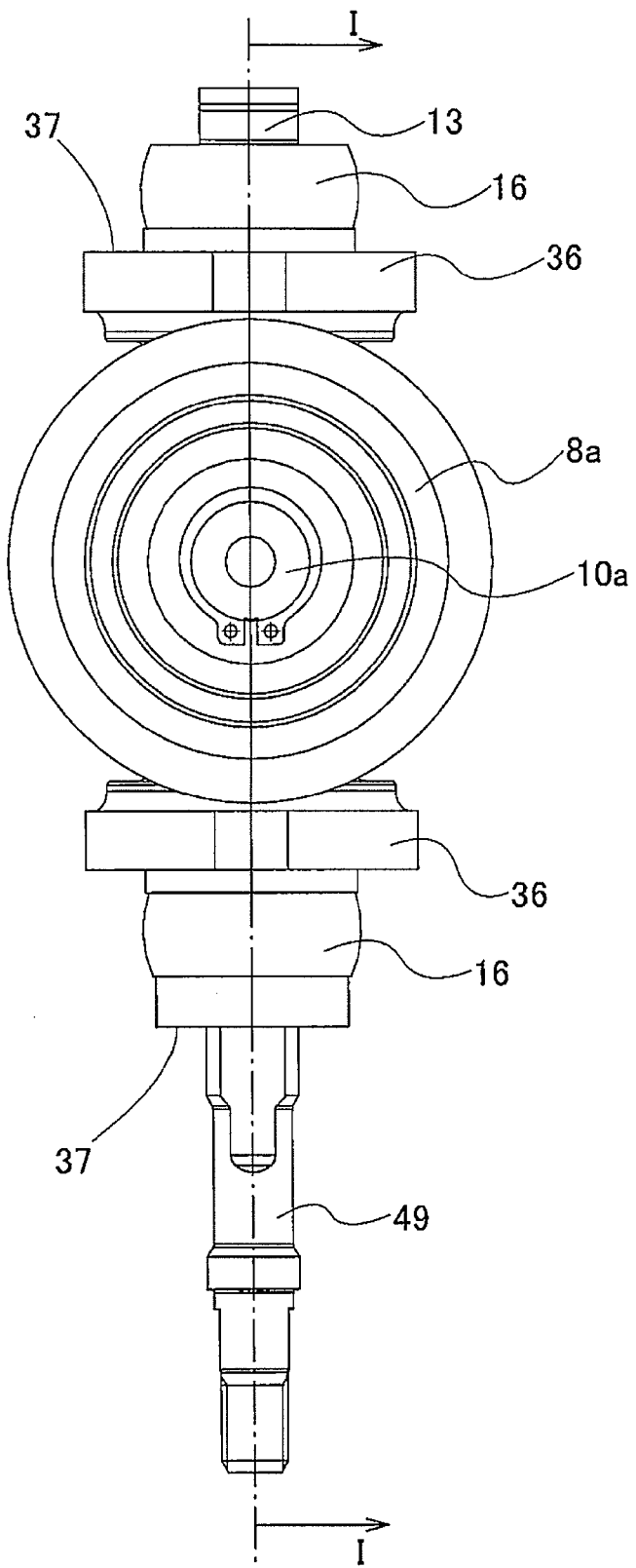
FIG. 13 is a front view illustrating a trunnion comprising a power roller of the toroidal continuously variable transmission of FIG. 11.

In this embodiment, as illustrated in FIG. 11, free pivoting movement of the yokes 46A, 46B is enabled by protrusions 47, 48 that are provided on the center sections of the outside surface sides (side surfaces opposite from the power roller 8a) of the yokes 46A, 46B. The protrusions 47, 48, for example, are in a state of being in contact with a member that is attached to the casing (not illustrated in the figure).

Figure 14:
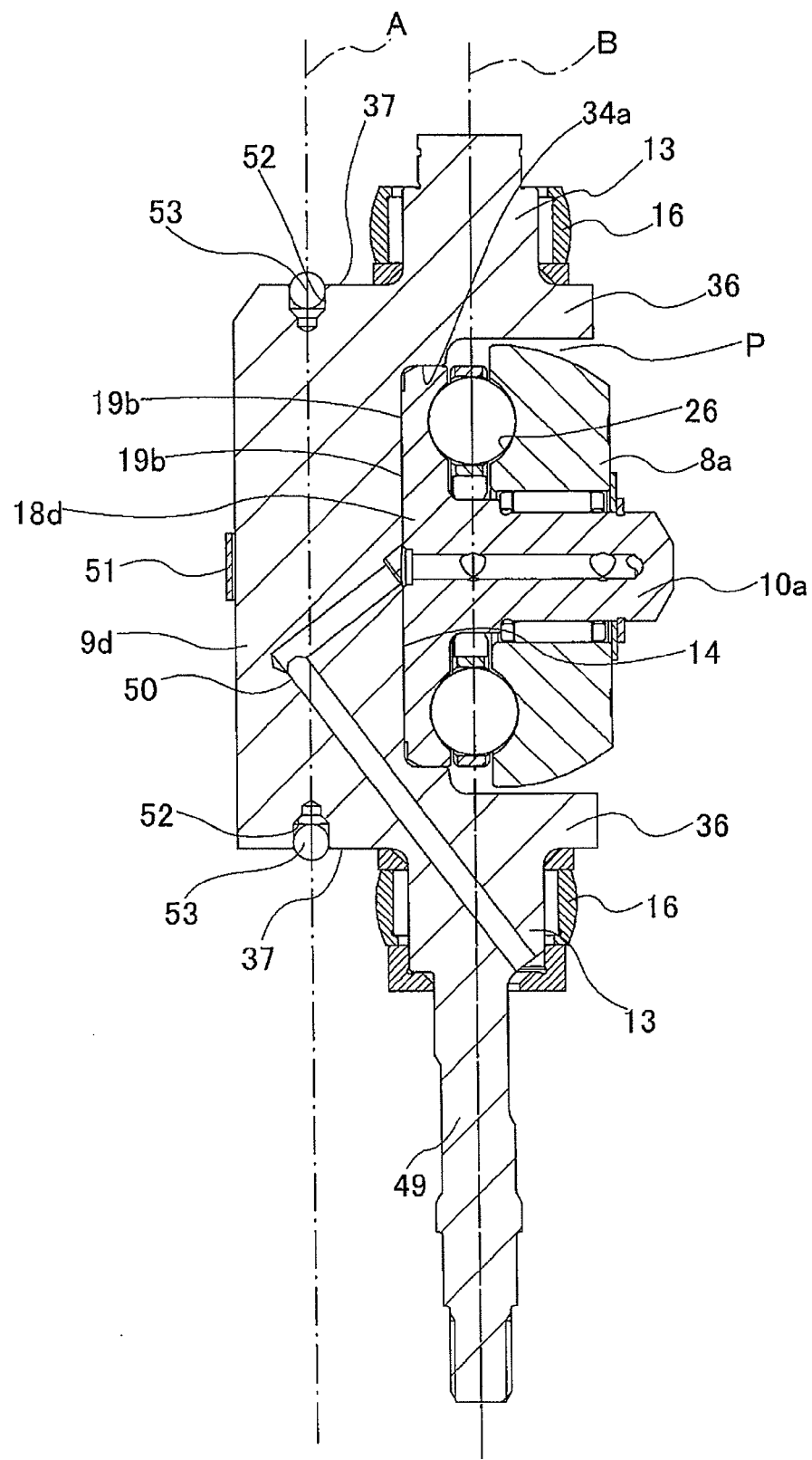
FIG. 14 is a cross-sectional view of section I-I in FIG. 13.
Figure 15:
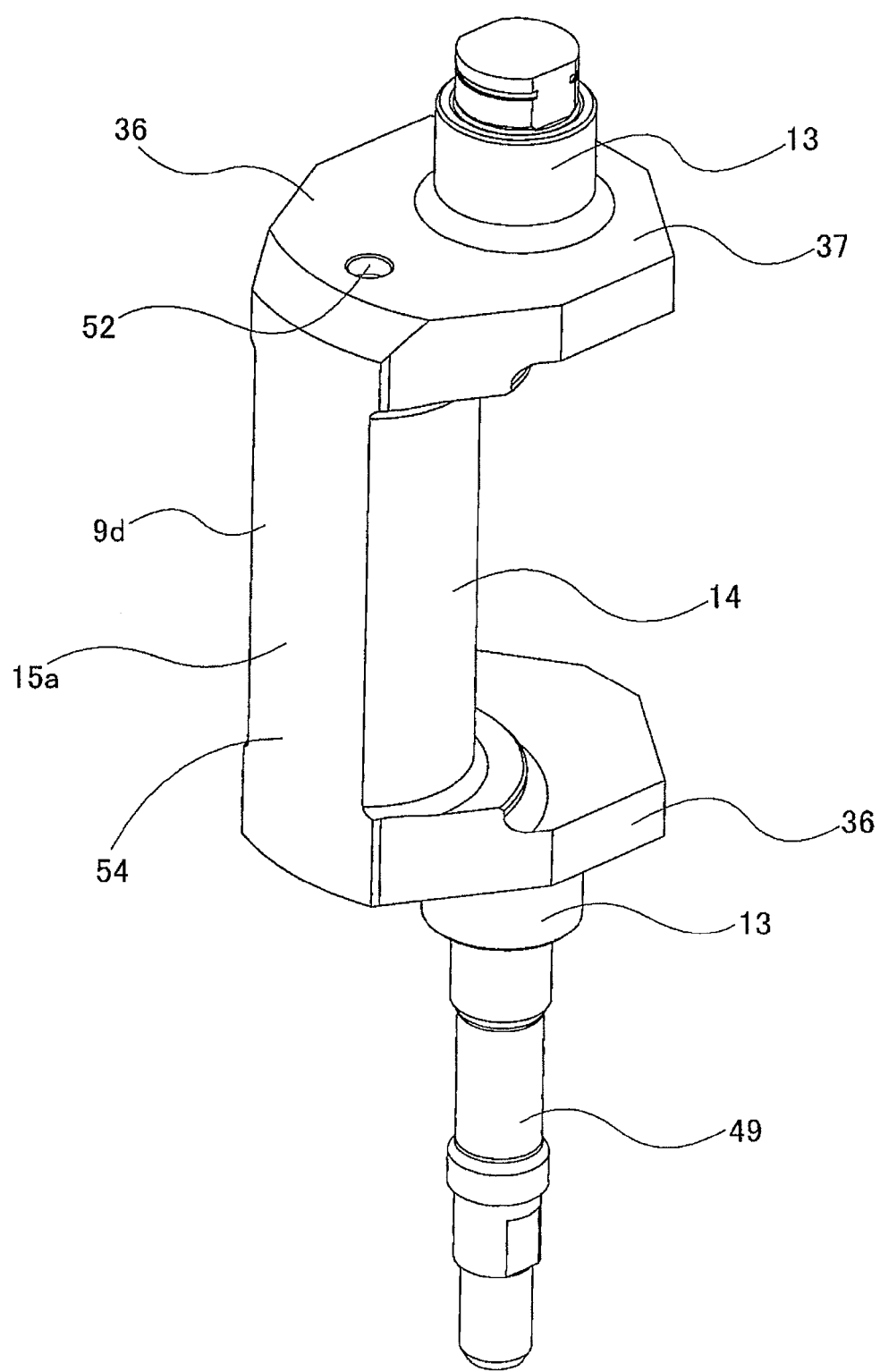
FIG. 15 is a perspective drawing illustrating only the trunnion that has been removed from the drawing in FIG. 12.
Figure 16:
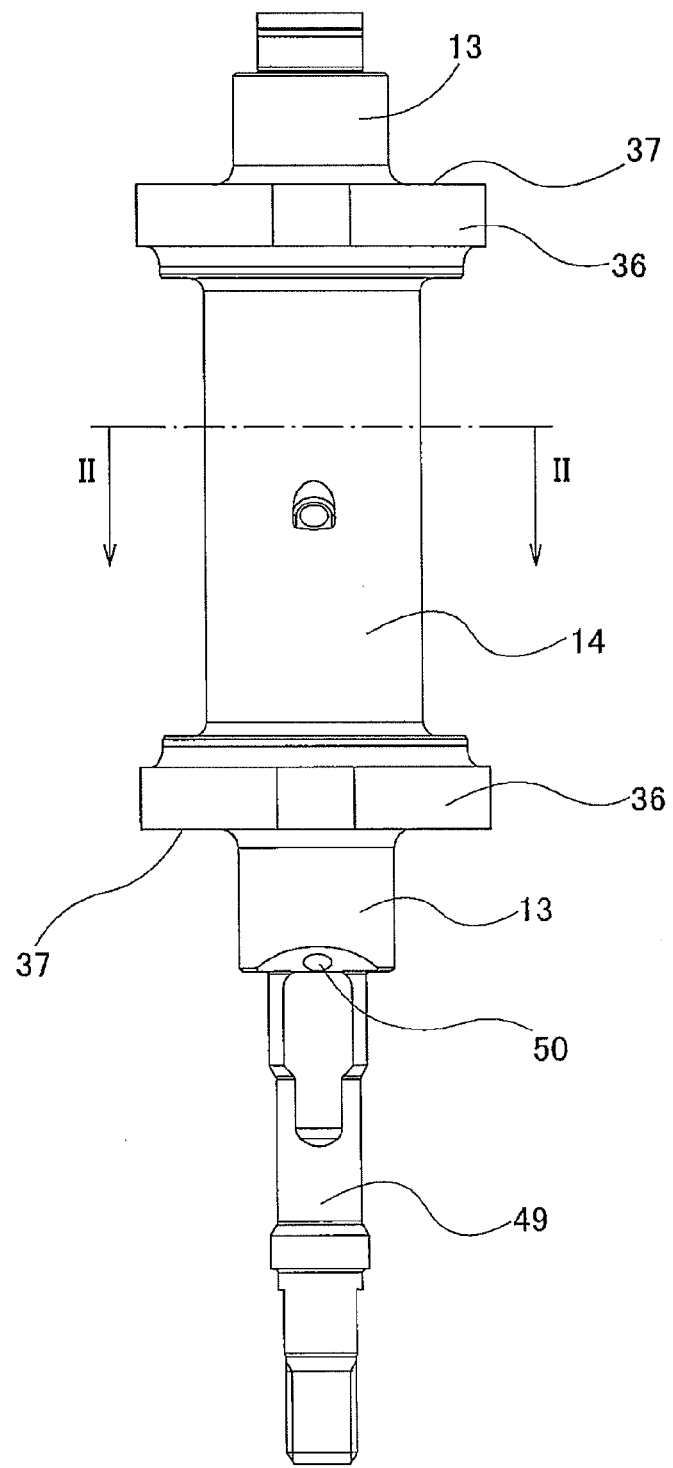
FIG. 16 is a front view illustrating the trunnion in FIG. 15.
Figure 31:
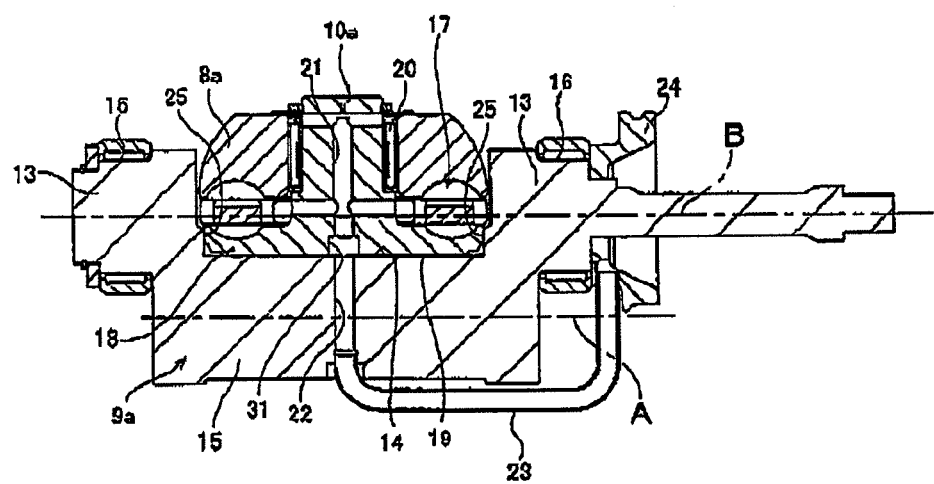
FIG. 31 is a cross-sectional drawing of cross section Y-Y in FIG. 29.
Figure 32:
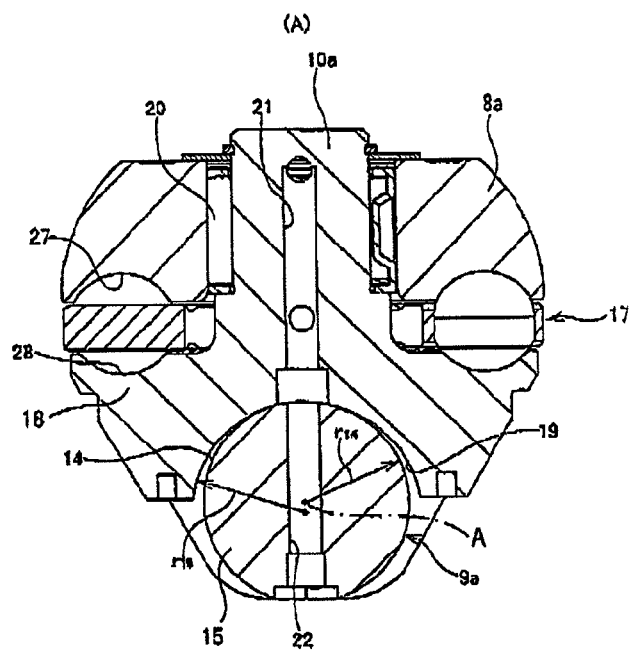
FIGS. 32A and 32B are drawings corresponding to cross section Z-Z in FIG. 28, where
Figure 32:
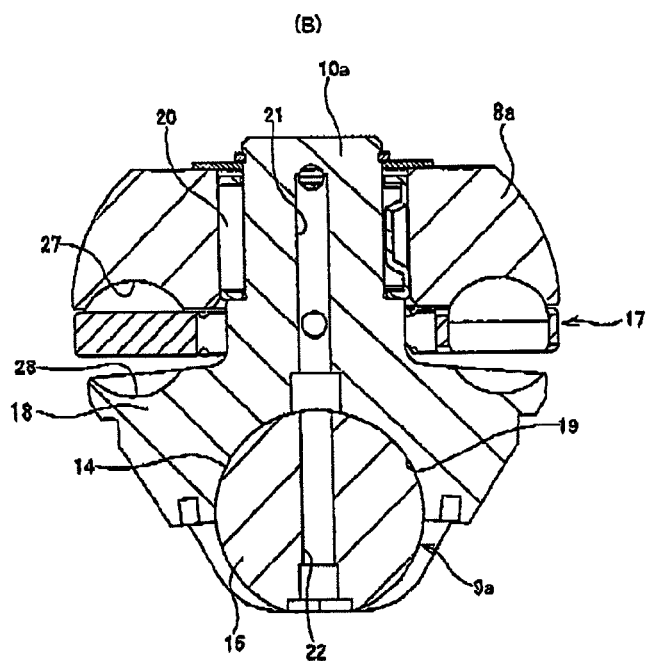
Figure 33:
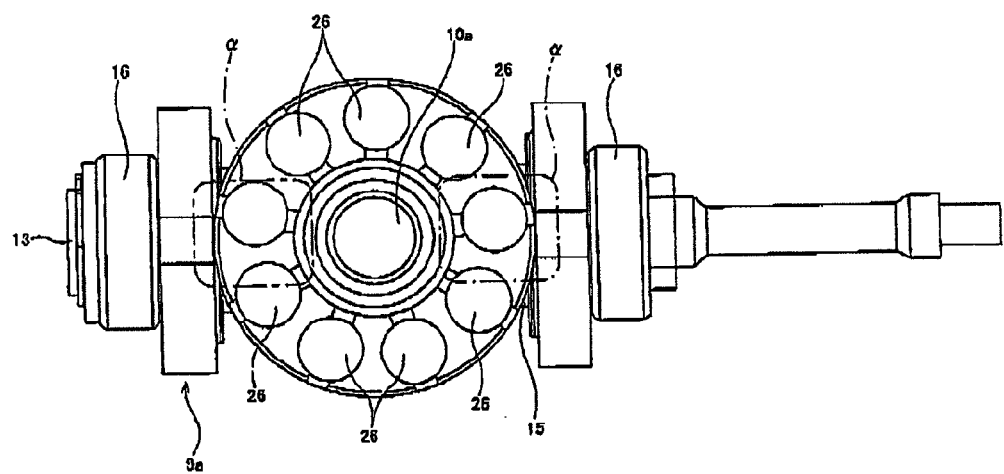
FIG. 33 is a drawing similar to FIG. 29 from which the power roller and pulley have been removed in order to illustrate the areas where the surface pressure at the points of rolling contact becomes high due to elastic deformation of the outer race.

In addition, in the second example of conventional construction illustrated in FIG. 31, part of an oil supply path that supplies lubrication oil to the various bearings of the power roller 8a from the drive rod side is formed on the outside of the trunnion 9a using an oil supply pipe, however, as illustrated in FIG. 11 and FIG. 14, in this embodiment, all of the oil supply paths that supply lubrication oil to the power roller 8a side from the drive rod 49 side are formed as oil holes 50 inside the trunnion 9d.

As illustrated in FIG. 11 to FIG. 17, the trunnion 9d, which is provided with the power roller 8a of the toroidal continuously variable transmission of this embodiment, except for the shape of the concave section 19b of the outer race 18d, has the same construction as that of the first embodiment. It is possible to use the shape of the first embodiment or other alternative example as the shape of the concave section 19b.

In this embodiment, the outer race 18d is supported by a separation prevention bracket 51 such that it does not separate from the support beam section 15a. The separation prevention bracket 51 is placed over the rear surface side of the support beam section 15a, and both end sections are fastened to the left and right side sections of the rear surface of the outer race 18d which bulge out from the support beam section 15a to right and left in the width direction thereof. Moreover, the separation prevention bracket 51 is such that it does not hinder rotation of the power roller 8a within a necessary range around the cylindrical convex surface 14 of the trunnion 9d.

As in the first embodiment, no particular problems with the transmission ratio occur, and by rotating the power roller 8a around the center axis of the cylindrical convex surface 14, and moving the power roller 8a in the axial direction of the input rotating shaft 2, it is possible to correspond to displacement of the members due to elastic deformation.

Similarly, in comparison to the conventional construction, this construction can be manufactured at low cost, and with construction wherein the cylindrical convex surface 14 of the trunnion 9d comes in contact with the concave section 19b of the outer race 18d, and by rotating the outer race 18d together with the power roller 8a, and moving the power roller 8a in the direction of the input rotating shaft 2, it is possible to make the resistance to movement when causing the power roller 8a to displace in the direction of the input rotating shaft 2 small when compared with the case of the conventional construction, so the pressure force of the pressure unit 12 can be efficiently transmitted to the traction contact point, and as a result, the traction coefficient can be set to a large value. In other words, it is possible to reduce the margin between the critical traction coefficient and the operating traction coefficient that was necessary in a conventional trunnion, and to improve the transmission efficiency.

In this embodiment, holes 52 are formed in both end surfaces 37 where the tilt shafts 13 of the trunnion 9d are formed, or in other words, in both end surfaces of the support beam section 15a, which are the outside surfaces of the base end section of both end sections (bent curved wall sections) 36, and at a position which overlaps with or crosses to the center line of the cylinder of the cylindrical convex surface 14 of the support beam section 15a.

The holes 52 have a circular cross section, or in other words are column shaped, such that the center of the column coincides with the center of the cylinder of the cylindrical convex surface 14.

Moreover, the holes 52 are such that the diameter at a shallow position differs from that at a deep position, where a shallow position is formed at a diameter that corresponds to the diameter of a contact member 53 (described later) that is pressure fitted into the holes 52, and at positions deeper than this, a diameter is used that is less than that diameter. The diameter of deep positions is half or less than the outer diameter of the contact member 53 and is shaped such that the contact member cannot enter. Moreover, the deep position and shallow position of the holes 52 are arranged on the same axis, where this center axis coincides with the center axis of the cylindrical convex surface 14.

In other words, the center of the holes 52 is located on both end surfaces 37 of the trunnion 9d at a position that is the center of the cylindrical convex surface 14. The holes 52 need not be constructed such that the diameter differs according to depth as described above, and could be column shaped having a diameter that does not differ.

Moreover, the contact members 53 are attached by pressure fitting the contact members 53 in the holes 52 in the trunnion 9d.

Furthermore, the end surfaces 37 of the trunnion 9d where the tilt shafts 13 are provided are end surfaces that face the yokes 46A, 46B. In other words, in FIG. 11, the upper end surface 37 of the trunnion 9d faces the yoke 46A, and the lower end surface 37 of the trunnion 9d faces the yoke 46B.

The contact members 53 are such that they protrude from the end surfaces 37 of the trunnion 9d toward the side of the yokes 46A, 46B. The center of the spherical contact members 53 coincides with the centerline of the holes 52, and coincides with the centerline of the cylindrical convex surface 14.

At the position of the tip ends of the portion of the contact members 53 that protrude from the end surfaces 37 of the trunnion 9d, the trunnion 9d and the yokes 46A, 46B are close to being in a state of contact.

In this way, the contact members 53 that are pressure fitted in the holes 52 are located between the trunnion 9d and yokes 46A, 46B, so the trunnion 9d does not come in contact with the yokes 46A, 46B.

The upper and lower contact members 53 basically maintain a constant state of almost being in contact with the yokes 46A, 46B, or in other words, maintain a state wherein the contact members 53 are in contact with the yokes 46A, 46B so that there is a little clearance.

The outside surface of the trunnion 9d, which is the opposite side of the cylindrical convex surface 14 of the support beam section 15a, is an outside cylindrical convex surface 54, whose center is the center axis of the tilt shafts 13.

Figure 17:
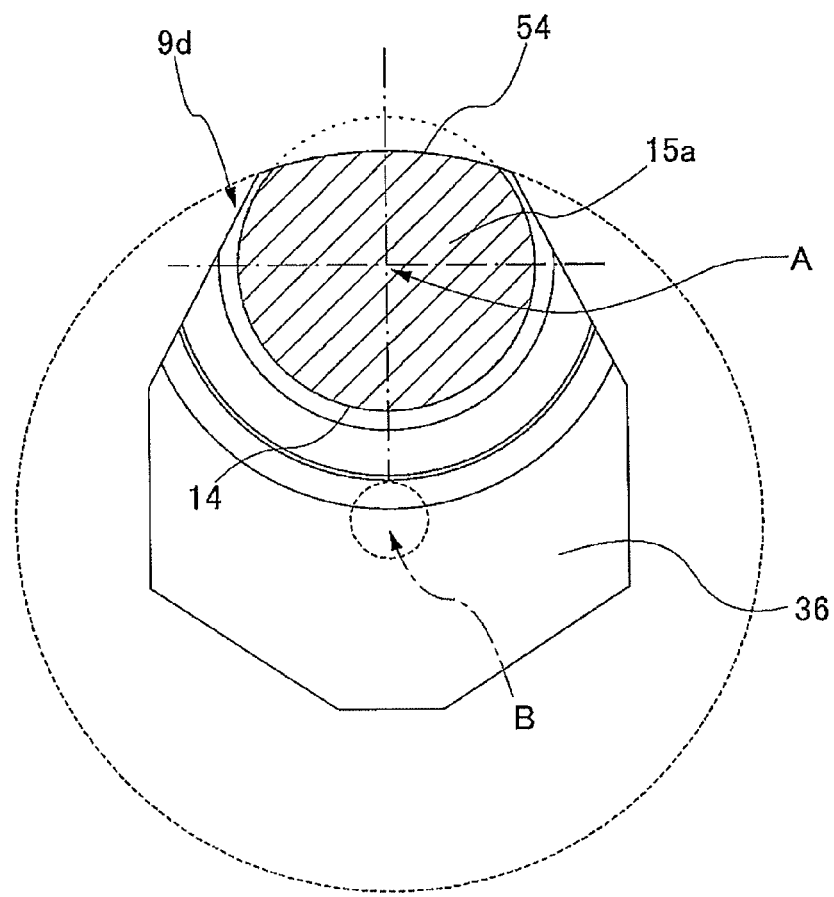
FIG. 17 is a cross-sectional view of section II-II in FIG. 16.

In other words, as illustrated in FIG. 17, the support beam section 15a of the trunnion 9d is such that the power roller 8a side thereof is a cylindrical convex surface 14, whose center is center axis A, and the opposite side thereof is an outside cylindrical convex surface 54, whose center is center axis B.

At the time of processing, for example, the holes 52 on the end surfaces of the trunnion 9d are used to set the trunnion 9d in a lathe. When doing this, the portion of the holes 52 on the deep side having a small diameter can be used.

In addition, the support beam section 15a is processed into a column shape, whose center is center axis A. Next, the trunnion 9d is set in the lathe using the tilt shafts 13, and, of the support beam section 15a that was processed as described above, a portion which protrudes outside a circle having a specified radius from the center axis B of the tilt shafts 13 on the opposite side from the power roller 8a is processed into a cylindrically-curved shape to form the outside cylindrical convex surface 54.

By making the portion on the opposite side of the support beam section 15a from the power roller 8a, or in other words, the rear surface of the trunnion 9d, be the outside cylindrical convex surface 54, there are no members or portions that protrude from the rear surface of the trunnion even when the trunnion 9d is rotated around the tilt shafts 13, and so compact placement of the trunnion 9d that rotates around the tilt shafts 13 can be achieved.

Moreover, by pressure fitting the contact members 53 into the holes 52, the contact members 53 can be attached to the trunnion 9d using the holes 52, or in other words, using the holes 52 used as reference holes for processing.

Construction is also possible wherein female screw threads are formed on the inner surface of the holes 52, male screw threads are formed around the contact members 53, and the contact members 53 are fastened by screwing them into the holes 52, or construction is also possible wherein the contact members 53 are attached to the holes 52 by welding or other method. However, taking into consideration the processing cost and the ease of work, pressure fitting the contact members 53 into the holes 52 is preferred.

In this way, the support beam section 15a of the trunnion 9d can be obtained by the same processing as the conventional support beam section, so it is possible to suppress the manufacturing cost of the trunnion 9d.

It is possible to use a standard spherical body as a contact member 53, and thus it is possible to acquire the contact members 53 at low cost. Preferably, the hardness, and particularly the surface hardness of the contact members 53 is higher than the hardness of the trunnion 9d. In other words, it is preferred that the contact members 53 be made of a material that is harder than the trunnion 9d. The contact members 53 can be made of the same material as the trunnion 9d, and in that case, the contact members 53 are hardened by thermal processing such as hardening.

Moreover, the contact members 53 come in contact with the yokes 46A, 46B, and the trunnion 9d does not come in contact with the yokes 46A, 46B, so it is possible to prevent wear of the trunnion 9d. In addition, it is not necessary to perform processing such as hardening of the portion of the trunnion 9d that comes in contact with the yoke 46A in order to prevent wear of the trunnion 9d, so it is possible to reduce the cost of processing the trunnion 9d.

Furthermore, by using a sphere as the contact member 53, the surface area of contact between the contact members 53 and the yokes 46A, 46B is nearly a point, so it is possible to reduce the friction acting between these members. In that case, it is not necessary to form protrusions on the trunnion 9d or yokes 46A, 46B, so production cost can be reduced. The contact members 53 do not need to be a sphere; for example, they could be column shaped with the portion that comes in contact with the yokes 46A, 46B being hemispherical, or they could be the similar shape having brim or collar shaped construction that comes in contact with the end surface 37 of the trunnion 9d over a large area.

In addition, so that the position of contact with the yokes 46A, 46B is shifted from the center of the cylindrical convex surface 14, a contact member comprising an insert section that is inserted or press fitted into the holes 52 of the trunnion 9d, an extension section that extends in any direction along the end surface 37 of the trunnion 9d from the insert section, and a contact portion which extends from the tip end, for example, of the extension section toward the yokes 46A, 46B and comes in contact with these yokes, can be employed. In other words, it is not necessary that the position of contact between the yokes 46A, 46B and the contact members 53 be on the centerline of the cylindrical convex surface 14.

However, it is necessary that the areas of the contact members 53 that come in contact with the yokes 46A, 46B have a narrow surface area, and have high hardness so that there is no wear; for example, the hardness must be higher than the hardness of the trunnion 9d.

Moreover, when the contact members 53 above are maintained in a state of almost being in contact with the yokes 46A, 46B, a plurality of trunnions 9d that are supported by the yokes 46A, 46B, for example four trunnions 9d, move vertically in precise synchronization due to the movement of the yokes 46A, 46B, and it becomes possible to more precisely synchronize the trunnions 9d using the yokes 46A, 46B than in the case wherein there are no contact members 53 and there is a space between the trunnion 9 and yokes 46A, 46B.

Embodiment 5

Next, a fifth embodiment of the present invention is explained with reference to FIG. 18. A feature of this embodiment is the construction and material of the power roller 8a, which is the inner race of the thrust ball bearing 17a, and the construction and material of the outer race 18a, and is applied not only to this embodiment of the present invention, but is also widely applied to toroidal continuously variable transmissions that include the conventional construction. Therefore, the other construction and function are the same as the construction and function of the conventional construction and first through fourth embodiments of the present invention, so the explanation below will center only on the features of this invention.

In this embodiment, the radius of curvature of the inner peripheral surface having an arc shaped cross section of the track groove of the inner race track 27 of the power roller 8a is a little less than the radius of curvature of the inner peripheral surface having an arc shaped cross section of the track groove of the outer race track 28 of the outer race 18a.

The outer race 18a is formed of high carbon steel having a carbon content of 0.5 weight % or greater. The material is not limited to that described below, however, being more specific, the outer race 18a is formed from a high carbon steel having the composition C: 0.5 to 1.3 weight %, Cr: 1.0 to 0.3 weight %, Si, Mo and Mn having a total content of 1.0 to 3.0 weight %, unavoidable impurities, and the remaining being Fe.

Moreover, the outer race 18a undergoes hardening and tempering at 200° C. or higher as the hardening heat treatment. As this hardening, through hardening is generally implemented.

The power roller 8a, which functions as the inner race, is formed of steel having the composition, C: 0.1 to 0.4 weight %, Cr: 1.0 to 3.0 weight %, unavoidable impurities, and the remaining amount Fe. The power roller 8a also undergoes hardening and tempering after carbonitriding as a hardening heat treatment.

In the toroidal continuously variable transmission of this embodiment, the thrust ball bearing 17a that includes the power roller 8a is not supported by way of a support shaft 10 as in the first example of conventional construction, so it is possible to reduce the bending stress that occurs in the outer race 18a more than when using such a support shaft.

Here, a force in the axial direction of the tilt shafts 13, or a force in the tangential direction at the area of contact between the power roller 8a and the input side and output side disks 1a, 1b, 6, is applied to the power roller 8a due to the friction between the surface around the power roller 8a and the inside surface of the input side and output side disks 1a, 1b, 6. This force is the so-called 2Ft force, and the size of this force is proportional to the force (torque) that is transmitted from the input side disks 1a, 1b to the output side disks 6. Through this 2Ft force, when trying to support the thrust ball bearing with respect to the trunnion using a support shaft as in the conventional construction, a large bending stress acts on the area of the outer race that comes in contact with the base side section of the support shaft.

On the other hand, in this embodiment, there is no support shaft, and movement is possible along the inside surface of the support beam section 15, so, in the main outer race section 35, when the 2Ft forces acts, this 2Ft force is received by the outer peripheral surface 33 of the main outer race section 35, or the outer portion of the side surface of the main outer race section 35 that faces the trunnion 9a, so it is possible to reduce the bending stress that occurs in the main outer race section 35 more than in the case of having a support shaft as in the conventional construction. While the bending stress that occurs in the outer race 18a is reduced, a large bending stress acts on the power roller 8a.

Moreover, in this embodiment, by making the radius of the track groove of the outer race track 28 greater than the radius of the track groove of the inner race track 27, the inner race spin control is employed where there is pure rolling between the inner race (power roller 8a) and the rolling bodies (balls) 26, and there is spinning and sliding between the outer race 18a and rolling bodies (balls) 26. In this case, the rolling bodies (balls) 26 slide and spin in the thrust ball bearing 17 on the outer race 18a side, so the amount of heat generated on the outer race 18a side is greater than on the power roller 8a side, and thus the temperature of the outer race 18a becomes hot.

Due to this, there is a tendency for the bending stress to decrease and the temperature to rise in the outer race 18a. For this reason, by making the carbon content of the outer race 18a high as described above, its heat resistance and hardness increase. Because the hardness of the outer race 18a is increased by increasing the carbon content thereof, it is possible to maintain durability thereof by performing hardening and tempering without performing surface hardening such as carburizing or carbonitriding. When the hardness is increased by increasing the carbon content, toughness becomes insufficient, and there is a possibility that cracking will occur in the case that a large bending stress occurs, so the bending stress that occurs in the outer race 18a is reduced as described above.

In high carbon steel, which is the material of the outer race 18a, when the carbon (C) contents drops below 0.5 weight %, it is not possible to obtain sufficient hardness for maintaining the durability of a completed product. Insufficient hardness for being able to maintain durability is HV700 (Vickers hardness) or greater on the surface. Also, when the carbon content is greater than 1.3 weight %, there is a possibility that coarse carbide will be formed in the stage of the raw material.

Moreover, in the raw material of the outer race 18a, it is preferred that the chromium (Cr) content be 1.0 weight % or more in order that sufficient hardness and wear resistance be maintained after hardening and tempering. Also, when more chromium than is necessary is added, there is an increase in cost, so preferably the chromium content is 3.0 weight % or less.

Furthermore, in the raw material of the outer race 18a, it is preferred that the total content of the silicon (Si), molybdenum (Mo) and manganese (Mn) be no less than 1.0 weight % and no greater than 3.0 weight %, and that tempering be performed at 200° C. or greater. When the total content of these elements is less than 1.0 weight %, there is a large decrease in hardness after high-temperature tempering is performed, and it is not possible to obtain sufficient durability. In addition, there are cases where the amount of residual austenite on the surface of a complete product after tempering will not be 20 volume % or greater. When the total content of these elements is greater than 3.0 weight %, problems such as a decrease in workability, increased in raw material cost, and a rise in temperature of parts directly underneath the track groove 28f of the outer race track 28 due to a decrease in thermal conductivity become a concern. Moreover, the tempering temperature has been set in consideration of the temperature and time where the members made of the raw materials above, or in other words the outer race 18a is used, and the higher the tempering temperature is, the higher temperature at which the outer race 18a can be used. In other words, so as to heighten the heat resistance, in this embodiment, the tempering temperature of the outer race 18a is preferably 200° C. or greater as described above.

The power roller 8a, that functions as the inner race of the thrust ball bearing 17a, operates in a state of inner race spin control as described above, and therefore the amount of heat generation of the power roller 8a is less than that of the outer race 18 with respect to the heat occurring in the thrust ball bearing 17a. Therefore, by reducing the amount of heat generated by the power roller 8a in the thrust ball bearing 17a when the thrust ball bearing 17a is in a state of inner race spin control, it is possible to lower the temperature of the power roller 8a. In doing so, it is possible to lower the temperature in the areas of contact between the traction surface (peripheral surface 55) of the power roller 8a and the input side and output side disks 1a, 1b, 6, and as a result, it is possible to set the power transmission coefficient μ in the areas of contact on the traction surface to a high value. When the temperature of the traction oil used in the toroidal continuously variable transmission becomes high, the slip μ decreases.

Furthermore, the power transmission coefficient μ in the areas of contact described above of the power roller 8a can be set to a high value, so it is possible to reduce the pressure force in the direction of the input shaft that is required for transmitting the same torque. This makes it possible to reduce the friction loss in the areas related to rotation. By being able to reduce the friction loss, the power transmission rate is improved, which makes it possible to improve fuel efficiency when the toroidal continuously variable transmission is applied to a vehicle.

In the power roller 8a, large bending stress occurs, so when high carbon steel having a carbon content of 0.5 weight % or greater is used as in the outer race 18a for which bending stress was reduced as described above, there is a possibility of cracking occurring, so in the raw material of the power roller 8a, low carbon steel having a carbon content of 0.5 weight % or less and having sufficient toughness against large bending stress is used.

In low carbon steel, which is used as the raw material of the power roller 8a that functions as the inner race of the thrust ball bearing 17a, when the carbon content is less than 0.1 weight %, hardness after hardening heat treatment becomes low, so there is a possibility that sufficient strength will not be obtained. When the carbon content is greater than 0.4 weight %, the hardness after hardening heat treatment becomes too high, so toughness decreases, and cracking when large bending stress occurs becomes a concern.

As described above, in addition to maintaining heat resistance, in order to maintain sufficient hardness and resistance to wear after hardening and tempering, it is preferred that the chromium content be 1.0 weight % or greater. However, when more chromium than is needed is added, the cost increases, so it is preferred that the chromium content be 3.0 weight % or less.

Moreover, in the raw material of the power roller 8a, the carbon content is low as described above, so even when hardening and tempering are performed as is, it is not possible to obtain a hardness of HV700 (Vickers hardness) or greater necessary for the surface of the completed power roller 8a. Therefore, hardening and tempering are performed after performing carbonitriding of the power roller 8a as a thermal hardening surface treatment. The reason for performing carbonitriding, is that there are advantages such as it is easier to obtain high hardness than by carburizing, the amount of residual austenite is high even at the same hardness, and the resistance to wear is high.

In this toroidal continuously variable transmission, by creating a state of inner race spin control by making the radius of the track groove of the inner race track 27 less then the radius of the track groove of the outer race track 28, the amount of heat generated on the inner race side of the thrust ball bearing 17a is reduced, and the amount of heat generated on the outer race side becomes high, thus making it possible to lower the temperature of the power roller 8a, which is the inner race; and by lowering the temperature of the power roller 8a, it becomes possible to improve the power transmission efficiency as well as improve fuel efficiency.

Here, construction is such that the outer race 18a is not supported by a support shaft on the trunnion 9a, and slides along the inside surface of the support beam section 15 of the trunnion 9a, so it is possible to reduce the bending stress that occurs in the outer race 18a. In addition, by using high carbon steel having a carbon content of 0.5 weight % or greater as the raw material of the outer race 18a in order to increase the heat resistance and hardness of the outer race 18a, it is possible to maintain the heat resistance necessary for the outer race 18a, and by hardening and tempering the surface of the outer race 18a, it is possible to obtain the necessary and sufficient hardness without performing thermal hardening surface treatment such a carburizing or carbonitriding. By doing so, with the thrust ball bearing 17a in a state of inner race spin control, even when the temperature of the outer race 18a becomes high, it is possible to handle the rise in temperature of the outer race 18a at low cost and maintain the durability of the outer race 18a.

Moreover, in the power roller 8a, larger bending stress occurs than in the outer race 18a as described above, so by using a low carbon steel having a carbon content lower then 0.5 weight %, for example, 0.4 weight % or less, it is possible to obtain a power roller 8a having high toughness capable of suppressing cracking even when large bending stress occurs. In addition, by using low carbon steel, and by performing carbonitriding, it is possible to bring the surface that possibly has insufficient hardness up to the necessary level, and thus it is possible to maintain sufficient durability of the power roller 8a.

By doing the above, for the thrust ball bearing 17a, it is possible to improve the durability of the power roller 8a and outer race 18a, while at the same time reduce cost.

In this embodiment, it was possible to reduce cost by not performing thermal hardening surface treatment such as carbonitriding of the outer race 18a, however, in order to increase the durability of the outer race 18a, it is possible to perform carbonitriding of the outer race 18a. By performing carbonitriding of the outer race 18a there are advantages such as being able to further increase surface hardness, improve resistance to wear and increase the amount of residual austenite, so when the cost is allowed, it is preferable that carbonitriding be performed as thermal hardening surface treatment.

Furthermore, in this embodiment, by setting the thrust ball bearing 17a in a state of inner race spin control, it is possible to reduce the amount of heat generated on the power roller 8a side and lower the temperature of the power roller 8a. However, when compared with the outer race 18a, in addition to the heat generated by the thrust ball bearing 17a, there is a possibility that the temperature of the power roller 8a will become higher than the outer race 18a due to the generation of heat on the traction surface between the input side and output side disks 1a, 1b, 6.

Therefore, making use at high temperature possible by increasing the tempering temperature as described above is feasible, however, when doing this, in order not to decrease the hardness due to tempering at high temperature, adding silicon, molybdenum and manganese at a total content of 1.0 weight % or greater is preferred. In doing so, it is possible to suppress a decrease in hardness after performing tempering at high temperature. In addition, it is possible to make the amount of residual austenite on the surface of the completed power roller 8a 20 volume % or greater.

Moreover, preferably the total content of silicon, molybdenum and manganese is 3.0 weight % or less, because when the content is greater than 3.0 weight %, problems such as a decrease in workability, increase in raw material cost, rise in temperature of parts directly below the inner race track groove 27 due to a decrease in thermal conductivity become a concern.

When silicon, molybdenum and manganese are added in the range described above, in the hardening and tempering process after carbonitriding of the power roller 8a, the tempering temperature is set in consideration of the time and temperature at which the power roller 8a will be used; and as described above, the higher the tempering temperature is, the higher the temperature is at which the power roller 8a can be used. Here, an annealing temperature of 200° C. or greater is preferred.

Furthermore, as described above, it is preferred that the amount of residual austenite on the surface of the completed power roller 8a and outer race 18a be 20 volume % or greater, and the reason is as follows. That is, in a transmission that uses a toroidal continuously variable transmission, there is foreign matter such as dust from wear that occurs in various locations. When this kind of foreign matter bites into the track surface or inner peripheral surface of the track groove of the inner race track 27 or of the track groove of the outer race track 28, there is a possibility that indentations will be formed on the track surfaces. In the case that indentations are formed, concentrated stresses may occur at the edges of the indentations and cause early peeling of the track surfaces to occur. In order to prevent the occurrence of this kind of indentation, it is preferred that the amount of residual austenite on the surface of the completed power roller 8a and outer race 18a be 20 volume % or greater. In addition, the residual austenite leads to a decrease in surface hardness, so in order to maintain sufficient hardness on the completed surface, it is preferred that the amount of residual austenite be no greater than 40 volume %.

Figure 18:
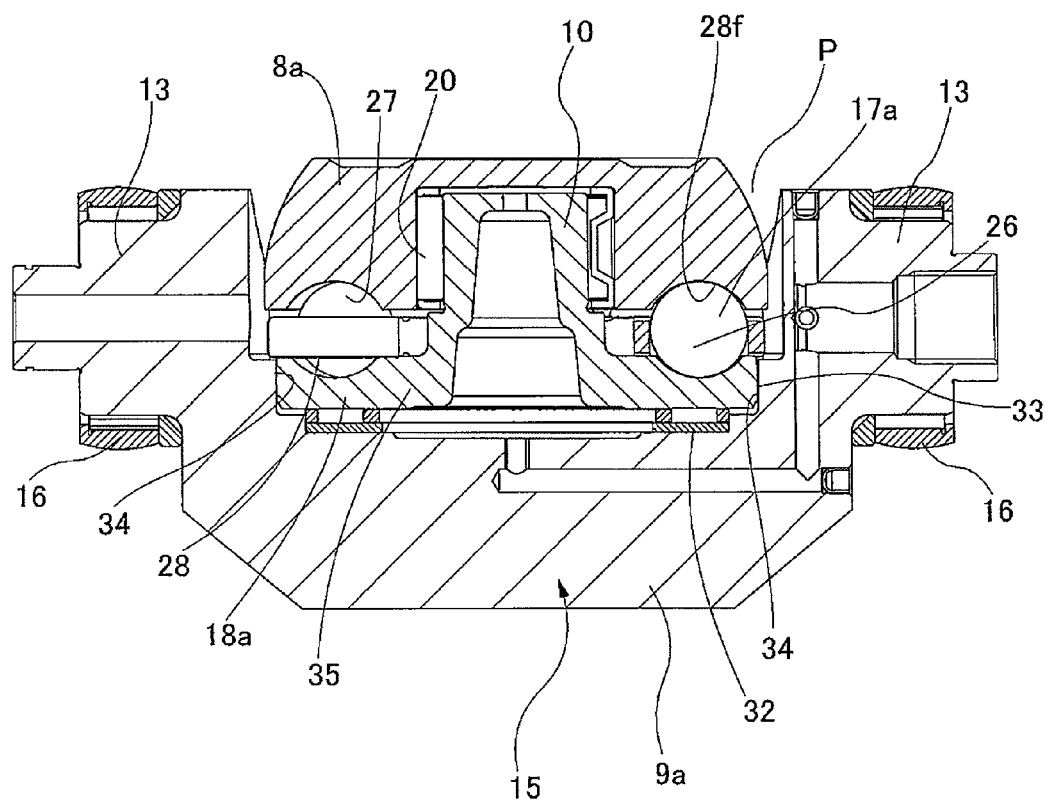
FIG. 18 is a cross-sectional drawing illustrating one example of a thrust ball bearing and trunnion that include a power roller of a toroidal continuously variable transmission for explaining a fifth embodiment of the present invention.

In the embodiment illustrated in FIG. 18, construction is such that there is a thrust needle bearing 32 between the inside surface of the support beam section 15 of the trunnion 9a that faces the outer race 18a and the outside surface of the outer race 18a that faces the support beam section 15 so that the inside surface of the support beam section 15 does not come in contact with the outside surface of the outer race 18a; however, as in the first embodiment, it is possible to not use a thrust needle bearing, and with the inside surface of the support beam section 15 in contact with the outside surface of the outer race 18a, it is possible to have the outer race 18a slide and move with respect to the support beam section 15.

By doing so, it become easier for heat to be transferred between the outer race 18a and the support beam section 15 of the trunnion 9a, where heat from the outer race 18a that is heated to a high temperature by the heat generated in the thrust ball bearing 17a is transferred to the trunnion 9a that is at a low temperature, cooling the outer race 18a. Therefore, it is possible to reduce the thermal effect on the outer race 18a, and to improve the durability of the outer race 18a.

Moreover, as described in the first embodiment, by fitting the cylindrical convex surface 14 of the support beam section 15 with the concave section 19a of the outer race 18a, they are substantially in surface contact with each other by way of lubrication oil, and thus heat conductivity from the outer race 18a to the trunnion 9a becomes high, and by being able to lower the temperature of the outer race 18a, it is possible to further improve the durability of the outer race 18a.

Embodiment 6

Figure 19:
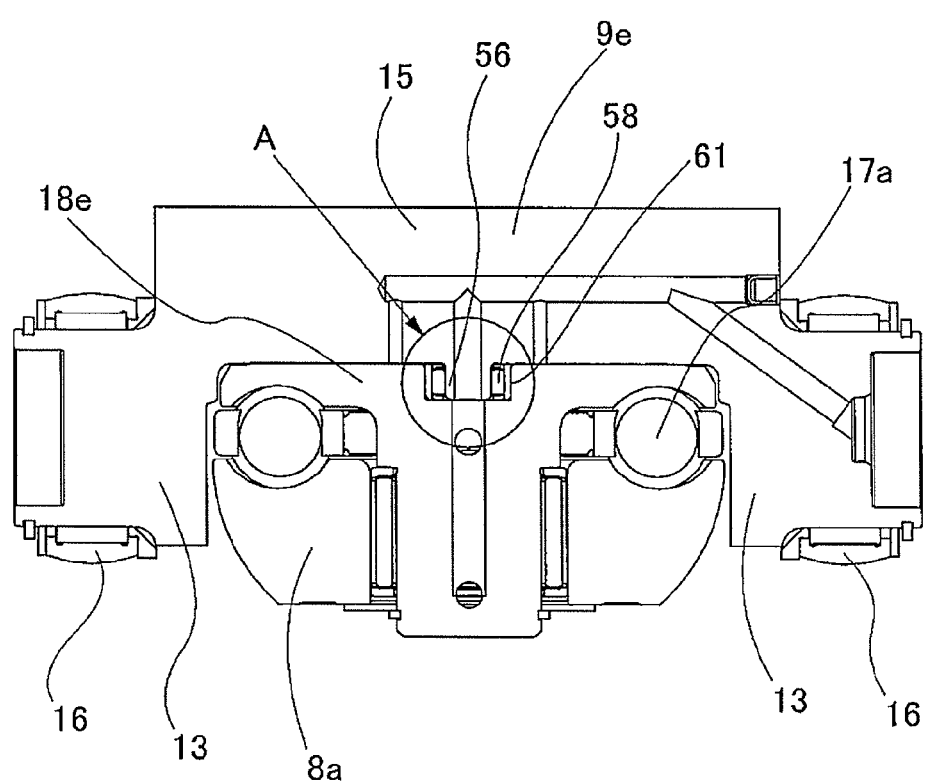
FIG. 19 is a cross-sectional drawing of a toroidal continuously variable transmission of a sixth embodiment of the present invention.
Figure 20:
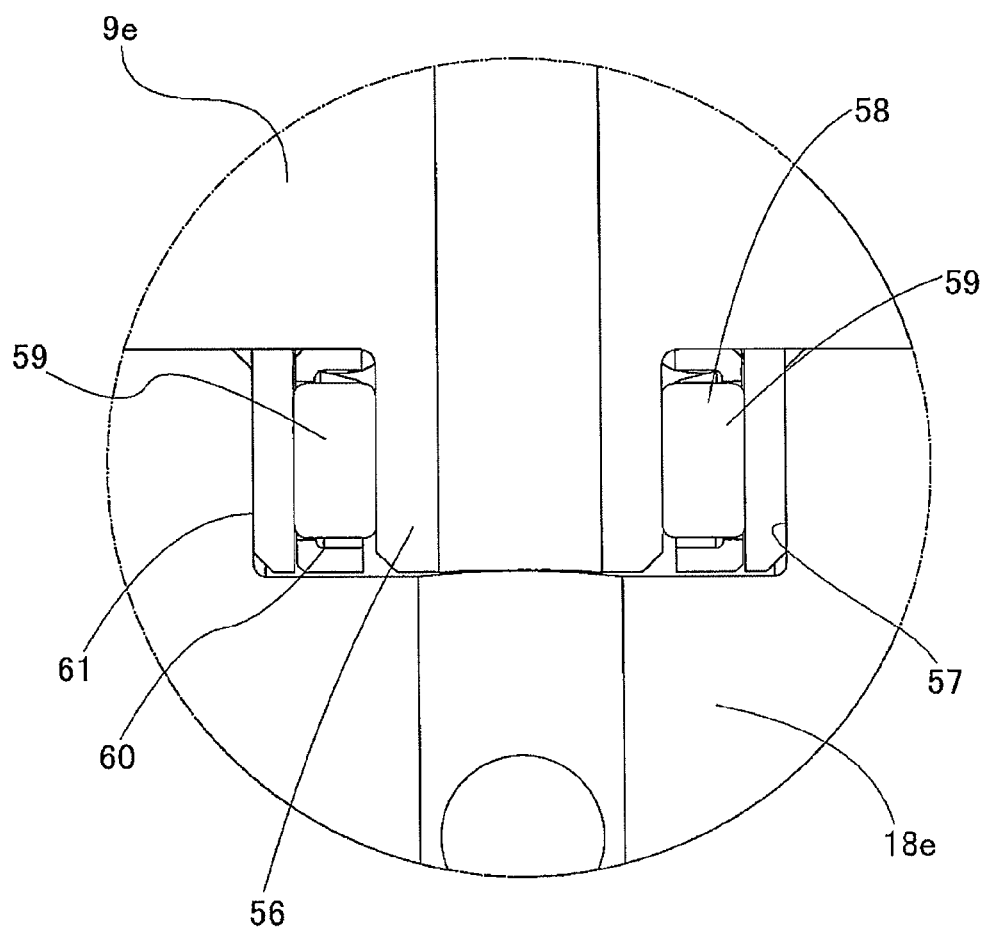
FIG. 20 is an enlarged cross-sectional drawing of area A in FIG. 19.
Figure 21:
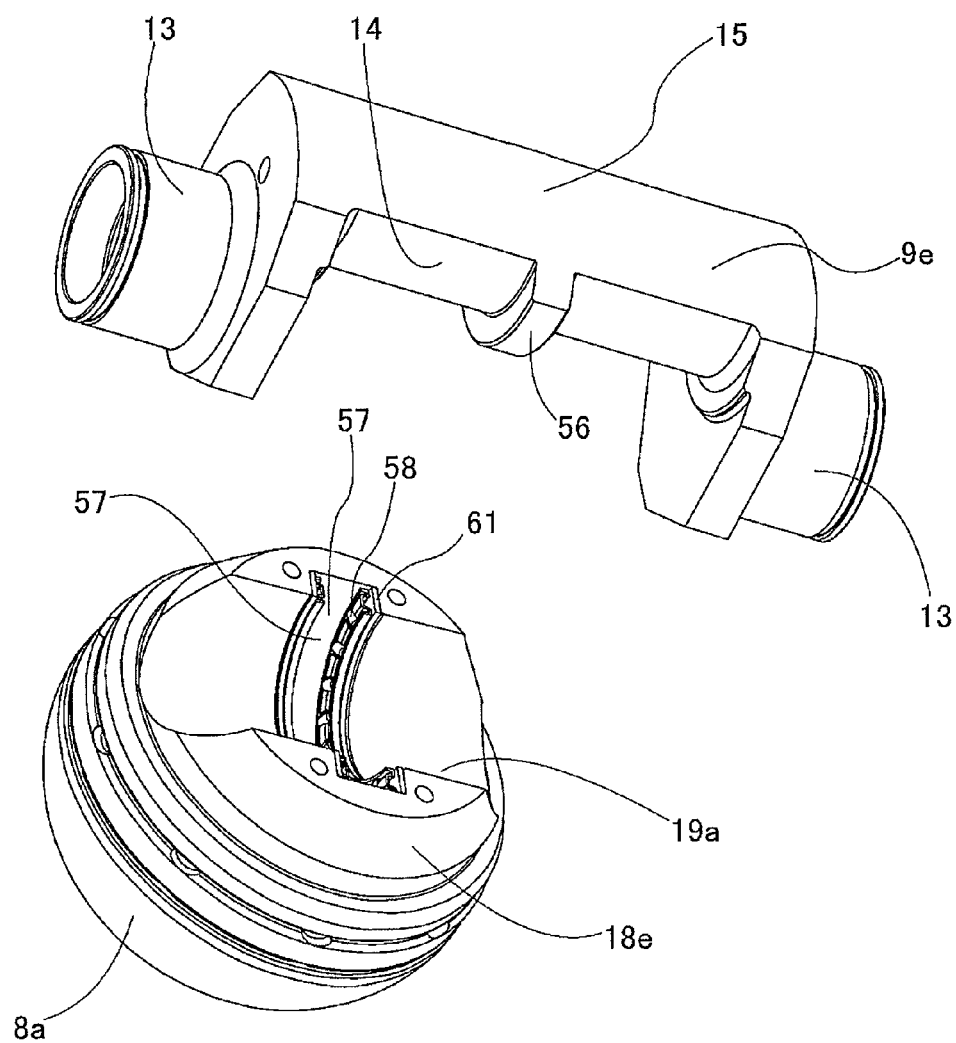
FIG. 21 is a perspective drawing illustrating a separated trunnion and power roller of the toroidal continuously variable transmission of FIG. 19.
Figure 22:
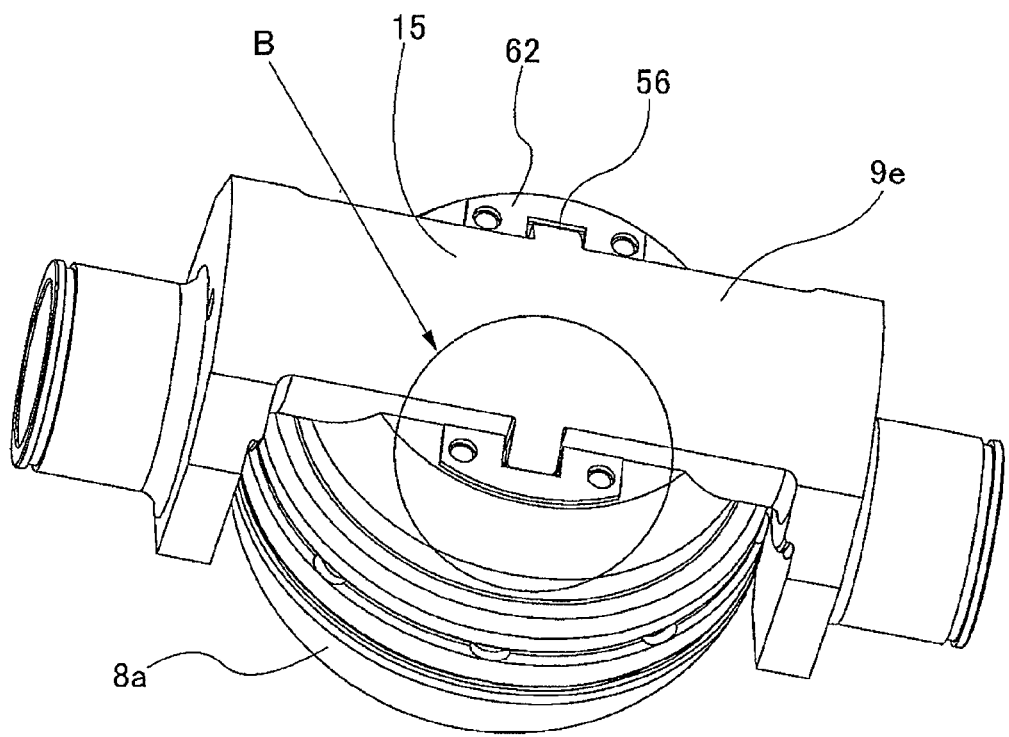
FIG. 22 is a perspective drawing of the case in which a stopper is provided in the toroidal continuously variable transmission of the sixth embodiment.
Figure 23:
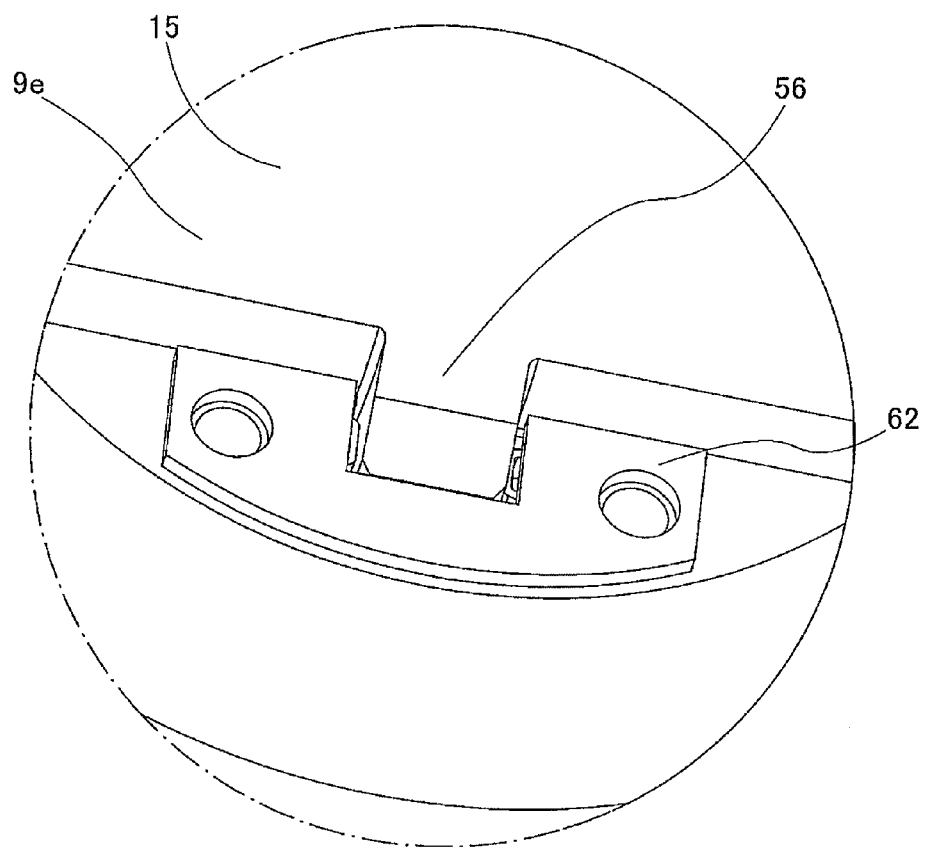
FIG. 23 is an enlarged perspective drawing of area B in FIG. 22.
Figure 24:
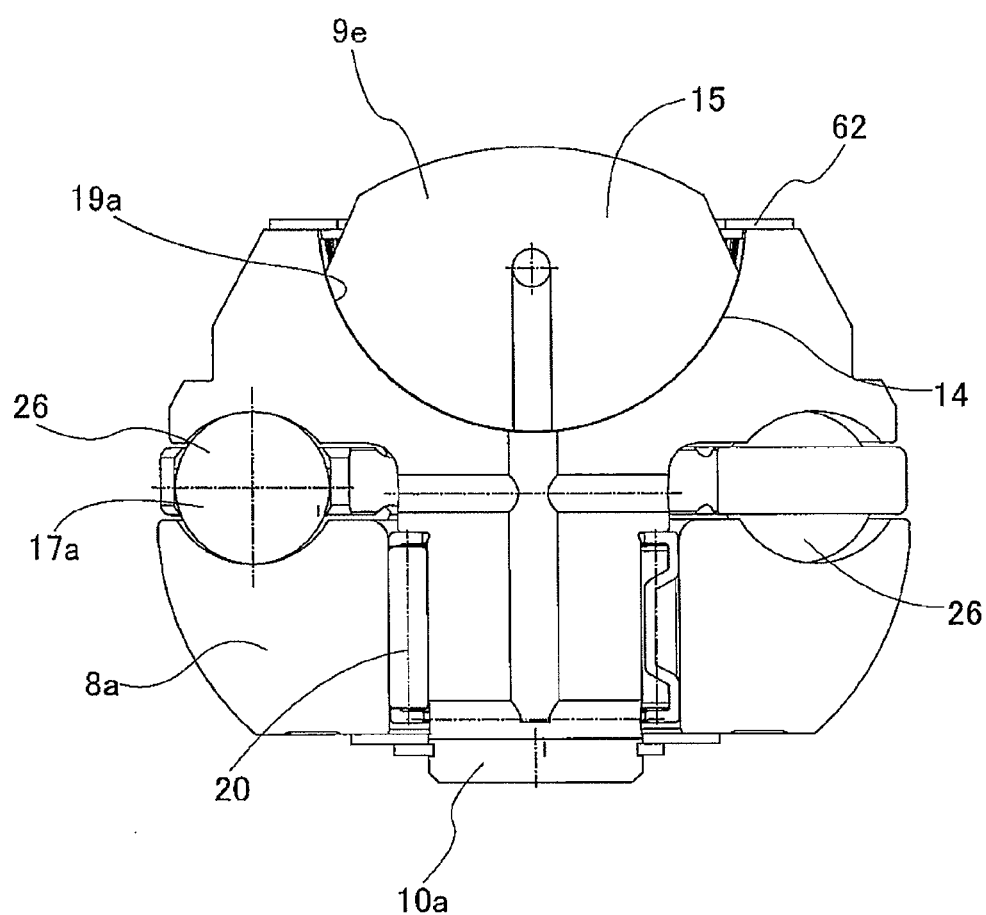
FIG. 24 is a cross-sectional drawing of the section of FIG. 22 where the trunnion convex section is formed.
Figure 25:
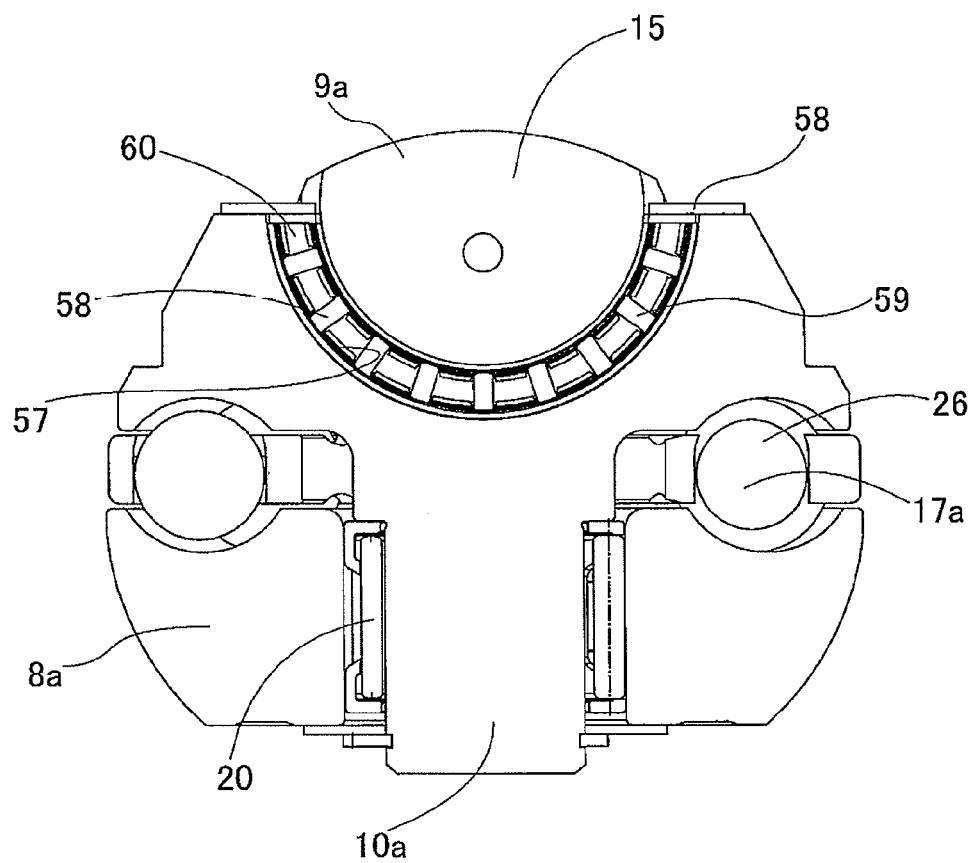
FIG. 25 is a cross-sectional drawing of the section of FIG. 22 where a needle bearing is provided.
Figure 26:
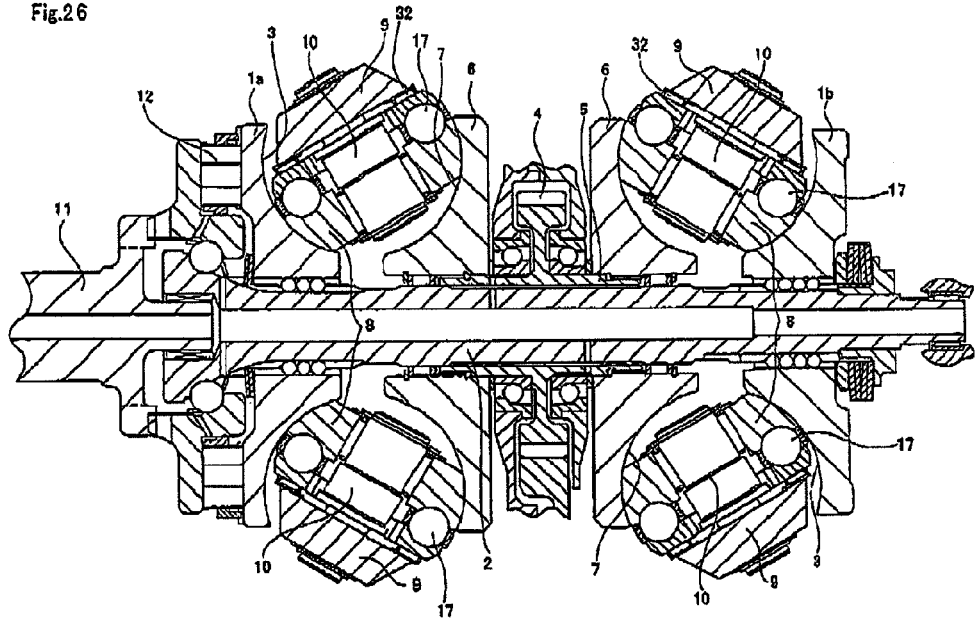
FIG. 26 is a cross-sectional drawing illustrating a first example of conventional construction.
Figure 27:
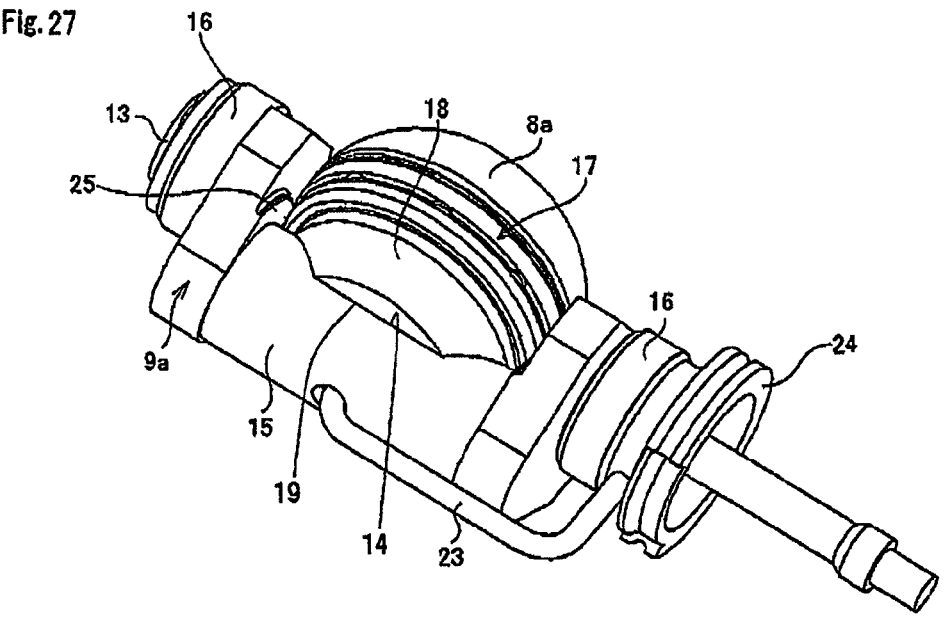
FIG. 27 is a perspective drawing illustrating a second example of convention construction, and illustrates a trunnion that supports a power roller by way of a thrust ball bearing as seen from the outside in the radial direction of the disks.
Figure 28:
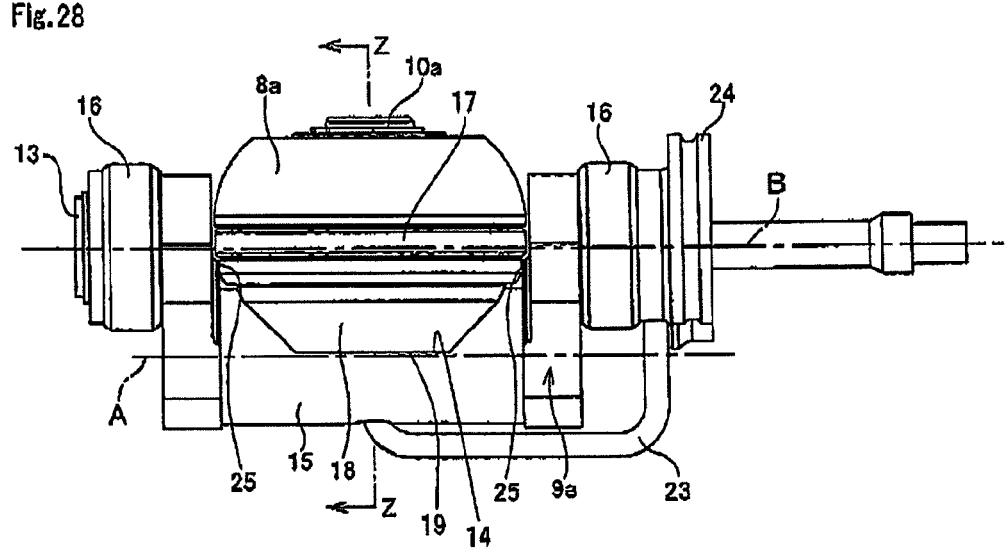
FIG. 28 is a front view of the trunnion illustrated in FIG. 27, and illustrates the state as seen from the circumferential direction of the disks.
Figure 29:
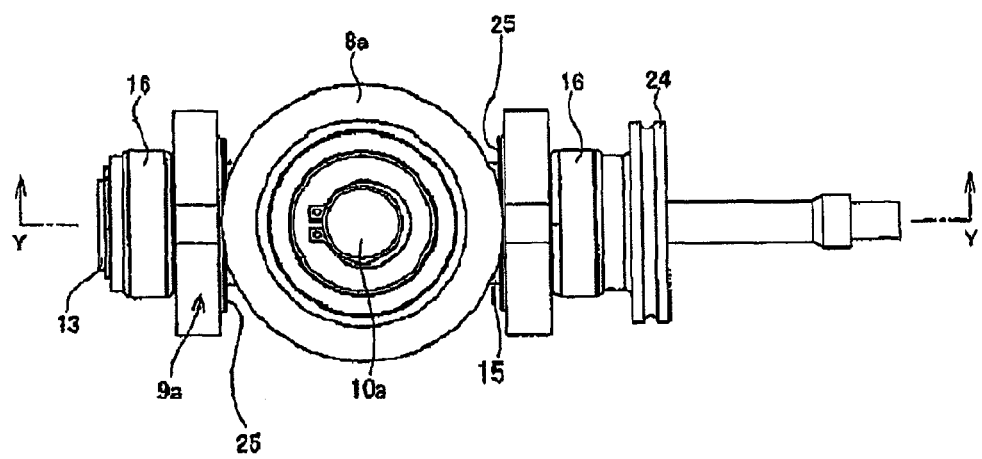
FIG. 29 is a top view as seen from above in FIG. 28.
Figure 30:
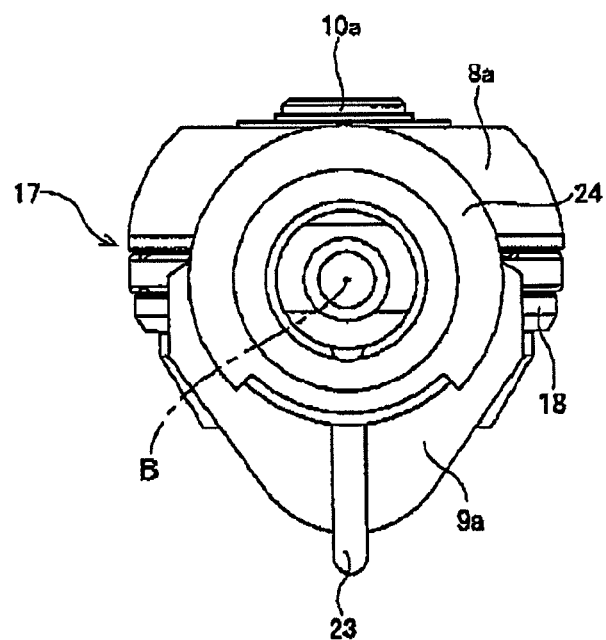
FIG. 30 is a side view as seen from the right side in FIG. 28.

FIG. 19 to FIG. 21 show a sixth embodiment of the present invention. A feature of the toroidal continuously variable transmission of this embodiment is construction of the portion that supports the power roller 8a with respect to the trunnion 9e so that it can displace in the axial direction of the input side and output side disks 1a, 1b, 6. The construction and function of the overall toroidal continuously variable transmission is the same as the other embodiments and conventional construction, so the explanation below will center only on the feature of this embodiment, and an explanation and illustration in the drawings of other parts will be omitted or simplified.

The trunnion 9e of the toroidal continuously variable transmission of this embodiment comprises a pair of tilt shafts 13 that are provided on both end sections such that they are concentric with each other, and a support beam section 15 that is located between both of these tilt shafts 13, with at least the inside side surface in the radial direction of the input side and output side disks 1a, 1b, 6 thereof being a cylindrical convex surface. Both the tilt shafts 13 are supported by yokes (not illustrated in the figure) or support plate sections of pivot frames by way of radial bearings 16 such that pivoting is possible.

As illustrated in FIG. 19 to FIG. 21, in the trunnion 9e of this embodiment, a convex section 56 is formed on the inside of the support beam section 15. The convex section 56 is formed by forming a hemispherical convex section 56 on the inside surface of the support beam section 15, which is the power roller side of the support beam section 15. Moreover, a groove 57, into which the convex section 56 of the trunnion 9e can be inserted, is formed on the outer race 18e of the thrust ball bearing 17a. Furthermore, a thrust needle bearing 58 is placed between the convex section 56 of the trunnion 9e and the groove 57 of the outer race 18e. The thrust needle bearing 58 has needle rollers 59, a retainer 60 that holds the needle rollers 59 and a race 61, with the outside surface of the convex section 56 of the trunnion 93 also forming a race surface. By providing a thrust needle bearing 58 between the convex section 56 of the trunnion 9e and the groove 57 of the outer race 18e in this way, it is possible to reduce the pivot resistance of the power roller 8a, and thus it is possible to improve the traction coefficient of the toroidal continuously variable transmission.

Moreover, the convex section 56 of the trunnion 9e receives the tangential force that is transmitted to the power roller, so it is possible to reduce the pinching of the outer peripheral portion of the outer race due to deformation of the trunnion 9e. In addition, by adjusting the thickness of the race 61, it is possible to easily adjust the position of the power roller 8a with respect to the trunnion 9e.

Furthermore, as illustrated in FIGS. 22 to 25, a stopper 62 may be provided in order that the thrust needle bearing 58 and race 61 do not fall out. Sufficient clearance is provided between the thrust needle bearing 58 and race 61 and the stopper 62 so that pivoting is possible. In addition, the stopper 62 can also function to prevent the power roller 8a from falling out from the trunnion 9e.

INDUSTRIAL APPLICABILITY

The present invention can be applied to various half toroidal type continuously variable transmissions such as a single-cavity type or double-cavity type.

What is claimed is:

1. A toroidal continuously variable transmission comprising:
an input side disk and an output side disk, the inside surfaces of each facing each other, and being supported concentric with each other around a center axis such that the disks can rotate freely with each other;
a trunnion that is skew to the center axis of the input side disk and output side disk, comprising end sections on both ends on which tilt shafts that are concentric with each other are provided, and a support beam section that extends between the both end sections, the trunnion being capable of pivotally displacing around the tilt shafts;
a thrust rolling bearing that is provided on the inside surface side of the trunnion; and
a power roller that is supported by the inside surface of the trunnion by way of the thrust rolling bearing such that it rotates freely, the peripheral surface thereof being a spherical convex surface that comes in contact with the inside surfaces of the input side disk and the output side disk,
wherein the support beam section of the trunnion comprises an inside surface that is a cylindrical convex surface having a center axis that is parallel with center axis of the tilt shafts and located further on the outside than the center axis of the tilt shafts;
the thrust rolling bearing comprises an outer race provided on the support beam section side and having an outside surface with a concave section that fits with the cylindrical convex surface of the support beam section, and a plurality of rolling bodies that are located between an outer race track that is formed around the inside surface of the outer race and an inner race track that is formed on the outside surface of the power roller, where together with the thrust rolling bearing being supported by the trunnion by the fit between the cylindrical convex surface of the support beam section and the concave section of the outer race such that pivotal displacement is possible in the axial direction of the input side disk and the output side disk, receives a load in the thrust direction that is applied to the power roller and supports the power roller such that the power roller rotates freely; and the concave section of the outer race has a pair of side surface sections on both sides in the width direction, the cylindrical convex surface of the support beam section coming in contact with the both side surface sections of the outer race at two positions in a circumferential direction;

wherein the pair of side surface sections comprises a pair of side concave curved surface sections not having a same center and each having a cross-sectional radius of curvature that is greater than a cross-sectional radius of curvature of the cylindrical convex surface of the support beam section.

2. The toroidal continuously variable transmission according to claim 1 wherein the concave section of the outer race has a Gothic arch shaped cross section.

3. The toroidal continuously variable transmission according to claim 1, wherein the concave section has a center concave curved surface section located between the side concave curved surface sections that have a cross-sectional radius of curvature that is less than the cross-sectional radius of curvature of the cylindrical convex surface of the support beam section, and end edges on the center side of both side concave curved surfaces smoothly connecting with end edges on both sides of the center concave curved surface section.

* * * * *